US007693992B2

(12) United States Patent
Watson

(10) Patent No.: US 7,693,992 B2
(45) Date of Patent: Apr. 6, 2010

(54) TECHNIQUE FOR PROVIDING ACCESS TO DATA

(75) Inventor: Scott F. Watson, Santa Clarita, CA (US)

(73) Assignee: Disney Enterprises, Inc., Burbank, CA (US)

( * ) Notice: Subject to any disclaimer, the term of this patent is extended or adjusted under 35 U.S.C. 154(b) by 756 days.

(21) Appl. No.: 10/764,783

(22) Filed: Jan. 23, 2004

(65) Prior Publication Data

US 2004/0215741 A1 Oct. 28, 2004

Related U.S. Application Data

(62) Division of application No. 09/595,573, filed on Jun. 14, 2000, now abandoned.

(51) Int. Cl.
*G06F 15/173* (2006.01)
(52) U.S. Cl. .................... 709/226; 709/217; 709/219; 709/231; 369/30.08; 700/94; 84/609
(58) Field of Classification Search ................ 709/217, 709/219, 231, 226; 369/30.08; 700/94; 84/609
See application file for complete search history.

(56) References Cited

U.S. PATENT DOCUMENTS

| 5,915,207 | A | 6/1999 | Dao et al. | |
|---|---|---|---|---|
| 6,237,031 | B1 * | 5/2001 | Knauerhase et al. | ........ 709/221 |
| 6,237,037 | B1 * | 5/2001 | Larsson | ....................... 709/229 |
| 6,239,793 | B1 | 5/2001 | Barnert et al. | |
| 6,243,815 | B1 * | 6/2001 | Antur et al. | .................... 726/11 |
| 6,311,215 | B1 * | 10/2001 | Bakshi et al. | ................ 709/221 |
| 6,340,300 | B1 * | 1/2002 | Padros Fradera | ............ 433/174 |
| 6,345,300 | B1 * | 2/2002 | Bakshi et al. | ................ 709/229 |
| 6,423,892 | B1 * | 7/2002 | Ramaswamy | ................ 84/609 |

(Continued)

OTHER PUBLICATIONS

"sonicnet.com: Me Music. It's Mine," retrieved from the internet on Oct. 5, 2000 at http://www.sonicnet.com/home/index.jhtml.
"Welcome to Spinner.com!" retrieved from the internet on May 16, 2000 at http://www.spinner.com/floor.jhtml?url=%2F_main.jhtml &_requestid=627659.
"Welcome to ClickRadio," retrieved from the internet on Oct. 5, 2000 at http://www.clickradio.com/bottom1.htm.

*Primary Examiner*—Liangche A Wang
(74) *Attorney, Agent, or Firm*—Ference & Associates LLC

(57) ABSTRACT

A data retrieval system provides data to a user of a client computer connected to multiple data stores and multiple other computers. A request for data is received at the client computer. The request is forwarded from the client computer to a server computer and intercepted at a reverse proxy caching connection. An attempt is made to locate the data at a data store at the reverse proxy caching connection. If the data is not found the request is forwarded to the server computer. In order to provide data to a user. A user interface is provided. Initially, data elements associated with a grouping of data elements are identified. Then, a subset of the selected data elements are selected based on weights associated with the data elements, without selecting more than a specified number of data elements that are associated with a same subcategory.

35 Claims, 27 Drawing Sheets

U.S. PATENT DOCUMENTS

| | | | |
|---|---|---|---|
| 6,442,588 B1 * | 8/2002 | Clark et al. | 709/203 |
| 6,446,080 B1 | 9/2002 | Van Ryzin et al. | |
| 6,546,421 B1 * | 4/2003 | Wynblatt et al. | 709/225 |
| 6,591,288 B1 * | 7/2003 | Edwards et al. | 709/203 |
| 6,823,225 B1 * | 11/2004 | Sass | 700/94 |
| 6,968,394 B1 * | 11/2005 | El-Rafie | 709/245 |
| 7,127,454 B2 * | 10/2006 | Deguchi | 707/3 |
| 7,284,036 B2 * | 10/2007 | Ramaswamy | 709/217 |

* cited by examiner

FIG. 9A

TECHNIQUE FOR PROVIDING ACCESS TO DATA

This is a divisional of application Ser. No. 09/595,573 filed Jun. 14, 2000, which application is hereby incorporated by reference in its entirety.

FIELD OF THE INVENTION

This invention relates in general to computer-implemented systems, and more particularly, to an improved technique for providing access to data to users over a network. The data may be, for example, audio and visual data.

BACKGROUND OF THE INVENTION

The Internet is a collection of computer networks that exchange information via Internet protocols, including, but not limited to, User Data Protocol (UDP), Transmission Control Protocol (TCP), or Hyper Text Transfer Protocol (HTTP). Via its networks, the Internet computer network enables many users in different locations to access information stored in data stores (e.g., databases) stored in different locations.

The World Wide Web (i.e., the "WWW" or the "Web") is a hypertext information and communication system used on the Internet computer network with data communications operating according to a client/server model. Typically, a Web client computer will request data stored in data stores from a Web server computer, at which Web server software resides. The Web server software interacts with an interface, which is connected to the data stores. These computer programs residing at the Web server computer will retrieve the data and transmit the data to the client computer. The data can be any type of information, including database data, static data, HTML data, or dynamically generated data.

A web site is a location on the Web. A web site may have one or more web pages. A web page is a document with a unique Uniform Resource Locator (URL). Typically, the first page of a web site is referred to as its home page. A Web browser, which is a software application, is used to locate and retrieve web pages.

With the fast growing popularity of the Internet and the World Wide Web (also known as "WWW" or the "Web"), there is also a fast growing demand for providing entertainment via the Web.

Some conventional systems provide customized media streams to users at client computers from server computers. In particular, a user at the client computer may specify preferences for media items. Then, a server computer may retrieve selected media files and concatenate them together to create a "stream". In this manner, a media stream is customized.

FIG. 1 is a schematic diagram illustrating a conventional system. A client computer 100 is connected to a streaming server computer 110 via the Internet 120. The client computer 100 has an embedded media player 102 that can play customized media streams. For example, the media player 102 can play video via video component 104 or play audio via audio component 106. The streaming server computer 110 is connected to a media database 112 containing media files (e.g., M1, M3, M5, and M9) and to a playlist database 114 containing playlists 116 (e.g., P1, P2, and P3). A playlist is a list of media items (e.g., songs).

When a user at the client computer 100 makes a request to access a customized media stream, the request is passed to the streaming server computer 110 via Internet protocols. The streaming server computer 110 retrieves a playlist 116 from a playlist database 114 based on user specified preferences. For example, the playlist may reference media files M1, M5, M9, and M3, in that order. The streaming server computer 110, which is format dependent, retrieves these media files from the media database 112 and concatenates the media files to create a customized media stream 118 for transmission to the client computer 100. The client computer 100 then uses the media player 102 to play the customized media stream 118 (e.g., M1, M5, M9, M3).

There are many inefficiencies in this system. For example, typically, conventional systems occupy CPU resources and network resources while the customized media stream is being played. Also, conventional systems typically require different software for working with data in different formats (e.g., a RealPlayer® G2 media player, a Windows® Media Player media player, or a QuickTime® media player). (RealPlayer is a registered trademark of RealNetworks Inc. in the United States and/or other countries. Windows Media is a trademark of Microsoft Corp. in the United States and/or other countries. QuickTime is a registered trademark of Apple Computers Inc. in the United States and/or other countries.)

Thus, there is a need in the art for an improved technique for providing data to users via a network, such as the Internet.

SUMMARY OF THE INVENTION

To overcome the limitations in the prior art described above, and to overcome other limitations that will become apparent upon reading and understanding the present specification, the present invention discloses a method, apparatus, and article of manufacture for a computer-implemented technique for providing access to data to users via a network.

According to one embodiment of the invention, a data retrieval system provides data to a user of a client computer connected to multiple data stores and multiple other computers. A request for data is received at the client computer. The request is forwarded from the client computer to a server computer. The request is intercepted at a reverse proxy caching connection. An attempt is made to locate the data at a data store at the reverse proxy caching connection. If the data is not found at the reverse proxy caching connection, the request is forwarded to the server computer.

According to another embodiment of the invention, in order to provide data to a user, a user interface is provided to enable the user to identify desired data. The desired data is retrieved and provided to the user. The user interface has a number of elements, including enabling users to create data element filters, to create custom stations, and to share custom stations with other users.

According to yet another embodiment of the invention, the data that is provided to a user is selected in a unique manner. Initially, data elements associated with a grouping of data elements are identified. Then, a subset of the selected data elements are selected based on weights associated with the data elements, without selecting more than a specified number of data elements that are associated with a same subcategory.

BRIEF DESCRIPTION OF THE DRAWINGS

Referring now to the drawings in which like reference numbers represent corresponding parts throughout:

FIGS. 9A-9D illustrate a web page that is illustrated upon selection of the age category for Adults.

DETAILED DESCRIPTION

Figure 1:
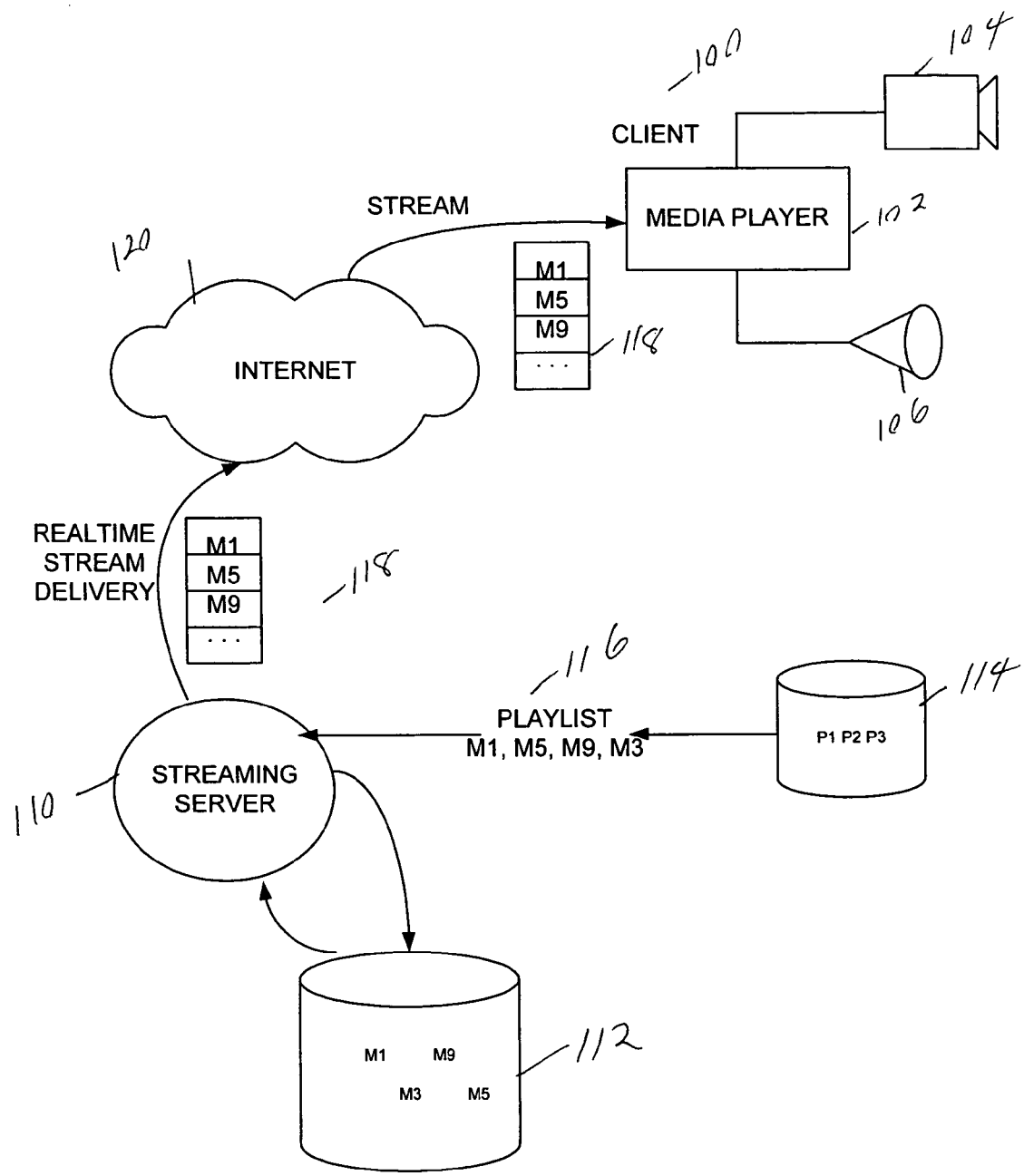
FIG. 1 is a schematic diagram illustrating a conventional system.

In the following description of an embodiment of the invention, reference is made to the accompanying drawings which form a part hereof, and which is shown by way of illustration a specific embodiment in which the invention may be practiced. It is to be understood that other embodiments may be utilized as structural changes may be made without departing from the scope of the present invention.

Overview

In one embodiment of the invention, a small plugin (i.e., program) is installed on a client computer. The plugin is format independent and needs to be installed only once. The invention generates a playlist (i.e., a list of data elements) based on user preferences. For example, the playlist may be a list of songs. Then, the plugin fetches each data element. Each data element may be encrypted. Then, the plugin concatenates the retrieved data elements and presents these to a media player as a stream (or as an encrypted stream, if encryption is used). The embedded media player connects to the plugin that provides custom stream. A decryption plugin, which is format dependent, decrypts the stream, if the stream has been encrypted.

There are several differences between conventional systems and the invention described herein. For example, conventional systems are stream-based, while the invention is file-based. Additionally, conventional systems have a server focus, while the invention has a client focus.

Unlike conventional systems, which are stream-based, the invention is file based. The stream-based approach requires a good deal of computational resources and custom software for each type of media player (e.g., a RealPlayer® G2 media player, a Windows® Media Player media player, a Quick-Time® media player) at the origin server. When the capacity of the main servers are exceeded, the stream-based system is scaled by replicating the entire system. Mechanisms for scaling normal streams, apply to shared streams; but, since conventional systems provide customized media streams that are unique, the mechanisms for scaling normal streams can not be used.

On the other hand, the file-based approach of the invention serves all files, regardless of format in the same Internet protocol (e.g., UDP, TCP, or HTTP). Conventional web server software is used. The web servers are scaled by accessing them through "reverse proxies". This reverse proxy system is the same technology scales to very large numbers of simultaneous users.

Media files can be cached by intermediate proxies (e.g., a corporate proxy), which further reduces bandwidth consumption and improves user experience. Specially tagged media files (e.g., promotions, advertisements, and stingers) can be cached to the end user's computer disk cache, which reduces bandwidth consumption. Media files (optionally encrypted) can be introduced to the user's computer prior to being called for by the playlist. This "cache-prefill" can happen via Internet down-time, broadcast (e.g., by satellite), or removable media (e.g., CDROM).

Since file fetch rates are purely a function of available bandwidth, playlists can be fetched in greater than real-time. This functionality can be used to fill a portable device quickly (e.g., a 50 minute show can be downloaded in 1 minute, assuming a 1 mega-bits-per-second (MBPS) connection and 20 kilo-bits-per-second (KBPS) audio).

Moreover, the conventional stream-based system requires significantly more incremental resources per listener than the file-based system. The resources are required for concatenating files into a stream, and these resources are held for the duration of the client's connection.

In the client-based scheme of the invention, each user brings their own incremental resources (their computer). The web servers must still serve incremental content, but this file serving is done at "server-to-server" speeds when feeding proxies, or is done at "maximum speed" when connecting directly to a client.

The invention is also advantageous in that the invention works with encrypted data elements. Conventional systems that serve streams "in the clear" (i.e., unencrypted) are relying on the stream being difficult to "record". However, programs for recording "streams" are available. Thus, serving encrypted content does significantly raise-the-bar against undesired copying/recording. In one embodiment, Triple-DES, which is a form of "strong encryption", is used.

Data Retrieval System

Figure 2:
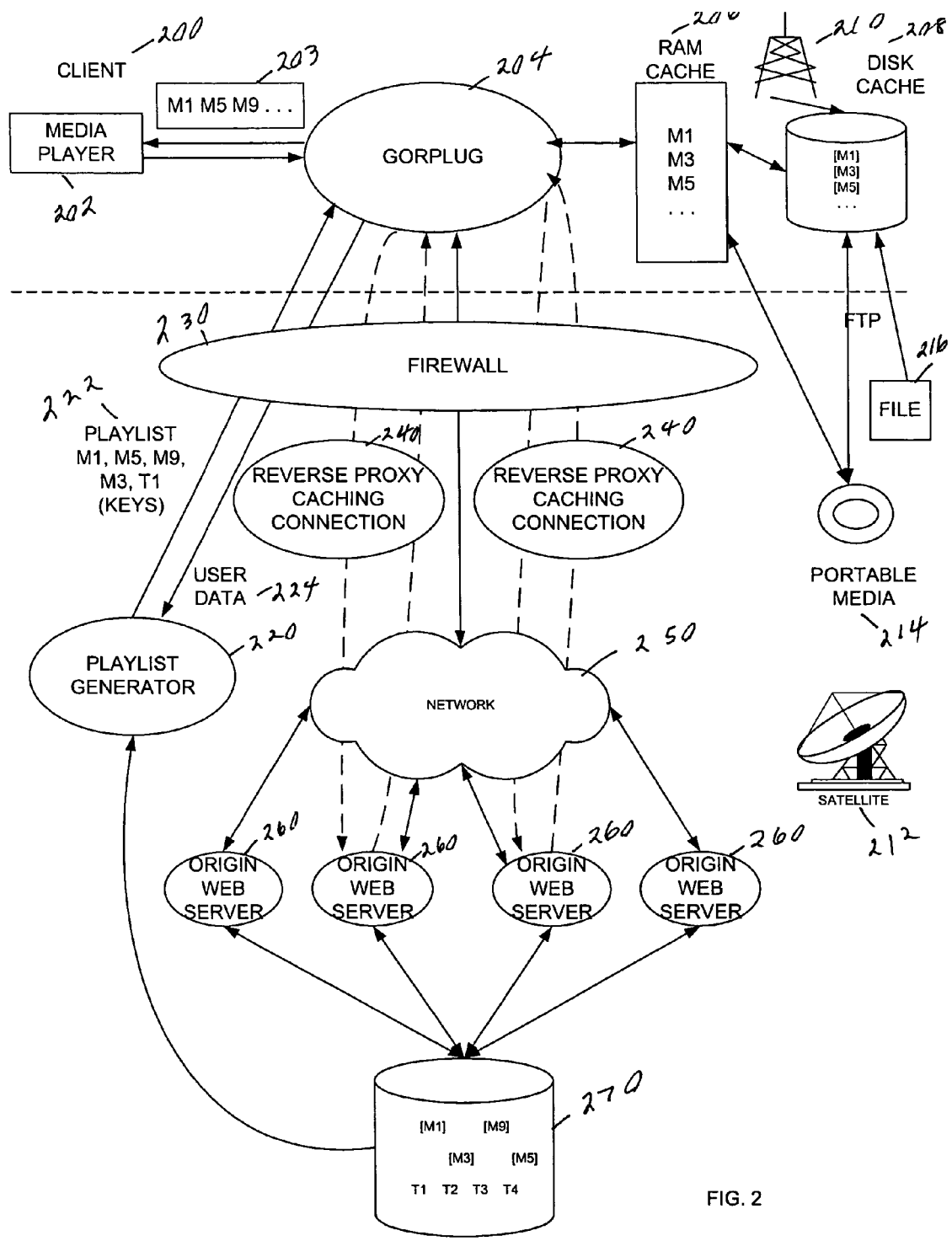
FIG. 2 is a schematic diagram that illustrates a hardware environment of an embodiment of the present invention, and, more particularly, illustrates a typical distributed computer system using a network to connect a client computer to other computers and data stores.

One aspect of the invention is directed to an improved technique for storing and retrieving data. For ease of reference, in this section, the invention will be referred to as a data retrieval system. FIG. 2 is a schematic diagram that illustrates a hardware environment of an embodiment of the present invention, and, more particularly, illustrates a typical distributed computer system using a network 250 to connect a client computer 200 to other computers 230, 240, 260, and data store 270.

Each computer 200, 230, 240, or 260 may be a personal computer, workstation, minicomputer, or mainframe. These computers are coupled to one another by various networks, including LANs, WANs, and the Internet. The network may be comprised of, for example, fiber optic cables. Typically, data is transmitted between computers and/or components via Internet protocols.

The client computer 200 executes a GORPLUG program 204. Additionally, the client computer 200 has a media player 202 that plays audio and video signals, such as digital music or movies. The media player 202 may comprise software, hardware, or a combination of software and hardware. Any media player 202 may be used with the techniques of the invention, such as a RealPlayer® G2 media player, Windows® Media Player media player, or QuickTime® media player).

The client computer 200 also includes a RAM (random access memory) cache 206 and a disk cache 208. A cache is a high speed data storage mechanism that may be implemented as a portion of memory. Data that may be used more than once may be retrieved from a data store and stored in the cache for easy and quick access. Furthermore, an antennae 210 at the client computer 200 may receive data via satellite 212 for storage in a cache (e.g., disk cache 208). Additionally, either cache may be loaded with data via a portable media 214 (e.g., compact disc). A data file 216 may also be stored in either cache via file transfer protocol (FTP) or some other Internet protocol (e.g., HTTP). The data in the cache may be stored as a file or with a Uniform Resource Locator (URL). In any case, the data is stored temporarily.

The client computer 200 is connected to a firewall 230. A firewall 230 is a system designed to prevent unauthorized access to a private network. A firewall 230 typically is an interface between an internet and an intranet. In this diagram, the firewall 230 prevents unauthorized access to/from a private network on which the client computer 200 resides and to/from the network 250. Each message passing between the network 250 and the intranet is checked by the firewall 230 to determine whether it passes security restrictions.

A playlist generator 220 creates playlists (i.e., lists of data elements) based on several factors, including weights assigned to data elements and user data 224, which is received from the client computer 200. Additionally, in one embodiment, the playlist generator 220 schedules advertisements, promotions, and stingers into a playlist of music files. The GORPLUG program 204 at the client computer 200 retrieves a playlist 222 from the playlist generator 220. The playlist 222 comprises an ordering of data elements (e.g., music files and advertisements, such as M1, M5, M9, M3, T1) as well as keys to identify the data elements. The GORPLUG program 204 receives a request from a user for a category of music files (e.g., Top Hits). Based on the user selection and other user data, the GORPLUG program 204 retrieves a playlist 222 from the playlist generator 220.

After retrieving the playlist 222, the GORPLUG program 204 retrieves each data element in the playlist 222. In particular, the GORPLUG program 204 optionally determines whether the data element is in RAM cache 206. If it is, the GORPLUG program 204 retrieves and plays the data element via the media player 202. The GORPLUG program 204 optionally determines whether the data element is in disk cache 208. If so, the GORPLUG program 204 retrieves and plays the data element. The GORPLUG program 204 optionally determines whether the data element is at the firewall 230. If so, the GORPLUG program 204 retrieves and plays the data element via the media player 202. Additionally, the GORPLUG program 204 optionally attempts to retrieve the data element from a reverse proxy caching connection and/or an origin web server 260 via the network 250.

In one embodiment, a reverse proxy caching connection 240 intercepts requests for data elements sent from the GORPLUG program 204 at the client computer 200 to an origin web server 260. The reverse proxy caching connection 240 is itself a server that acts as an interface between a client application, such as the GORPLUG program 204, and origin web servers 260 that are connected to data stores 270. The reverse proxy caching connection 240 optionally attempts to fulfill a request from the GORPLUG program 204. If the reverse proxy caching connection 240 is able to fulfil the request, the reverse proxy caching connection 240 processes the request and returns data to the GORPLUG program 204. If the reverse proxy caching connection 240 is unable to fulfil the request, the reverse proxy caching connection 240 passes the request onto an origin web server 260.

The reverse proxy caching connection 240 improves performance because it is able to store the results of requests, typically, for a period of time. For example, if a first request is to retrieve a particular data element, the reverse proxy caching connection 240 will determine whether it has stored that data element. If so, the reverse proxy caching connection 240 returns the data element to the GORPLUG program 204. Otherwise, the reverse proxy caching connection 240 forwards the request to an origin web server 260.

The origin web server 260 retrieves the requested data from data store 270. The data store 270 stores data elements (e.g., music files M1, M3, M5, and M9 and advertisements T1, T2, T3, and T4) in encrypted form (e.g., the music files) or unencrypted form (e.g., the advertisements). Note that the music files are encrypted and the advertisements are not for illustration only; any combination of files may be encrypted or unencrypted.

When the origin web server 260 retrieves the data element, the origin web server 260 returns the data element to the GORPLUG program 204 via the network 250. Any of the intermediate caches (e.g., the reverse proxy caching connection 240 or the firewall 230) may be bypassed at this time.

In one embodiment, the reverse proxy caching connection 240 may intercept the data. If so, the reverse proxy caching connection 240 will store a copy of the data element in its data store and forward it to the GORPLUG program 204 at the client computer 200. Then, the next time that data element is requested, the reverse proxy caching connection 240 is able to intercept the request and respond to the request with the data element in its data store, without accessing the origin web servers 260.

When the GORPLUG program 204 receives the data element, the GORPLUG program 204 optionally stores a copy of the data element in its RAM cache 206 and/or in the disk cache 208. Alternatively, the GORPLUG program 204 may move a copy of the data element from the RAM cache 206 to the client disk cache 208 when clearing the RAM cache 206 or based on how long the data element was in the RAM cache 206. Then, the next time a user at the client computer 200 requests the data element, the GORPLUG program 204 optionally may retrieve the data element from the RAM cache 206 or from the client disk cache 208.

The GORPLUG program 204 decrypts the encrypted data element. The GORPLUG program 204 continues to retrieve other data elements from the playlist 222. As other data elements are retrieved, the GORPLUG program 204 concatenates the data elements to create a stream 203 and provides the stream 203 to the media player 202 for playing for a user.

It is to be understood that many scenarios are possible for retrieving data elements. For example, the GORPLUG program 204 may directly attempt to retrieve data elements from the reverse proxy caching connection 240, without checking caches 206 and 208. Alternatively, the GORPLUG program 204 may attempt to retrieve data elements from disk cache 208, without checking RAM cache 206.

The computer programs executing at each of the computers, including the GORPLUG program 204, are comprised of instructions which, when read and executed by the computers, cause the computers to perform the steps necessary to implement and/or use the present invention. Generally, computer programs are tangibly embodied in and/or readable from a device, carrier, or media, such as memory, data storage devices, and/or data communications devices Under control of an operating system, the computer programs may be loaded from the memory, data storage devices, and/or data communications devices into the memory of each computer for use during actual operations.

Thus, the present invention may be implemented as a method, apparatus, system, or article of manufacture using standard programming and/or engineering techniques to produce software, firmware, hardware, or any combination thereof. The term "article of manufacture" (or alternatively, "computer program product") as used herein is intended to encompass a computer program accessible from any computer-readable device, carrier, or media, including the internet. Of course, those skilled in the art will recognize many modifications may be made to this configuration without departing from the scope of the present invention.

Those skilled in the art will recognize that the environment illustrated in FIG. 2 is not intended to limit the present invention. Indeed, those skilled in the art will recognize that other alternative hardware environments may be used without departing from the scope of the present invention. For example, the system described can apply either to a general-purpose computer, or to a special-purpose system, such as an appliance. Additionally, the term computer is used to refer to any communication device, including, but not limited to, a personal digital assistant, an appliance, a personal computer, or a workstation.

Figure 3:
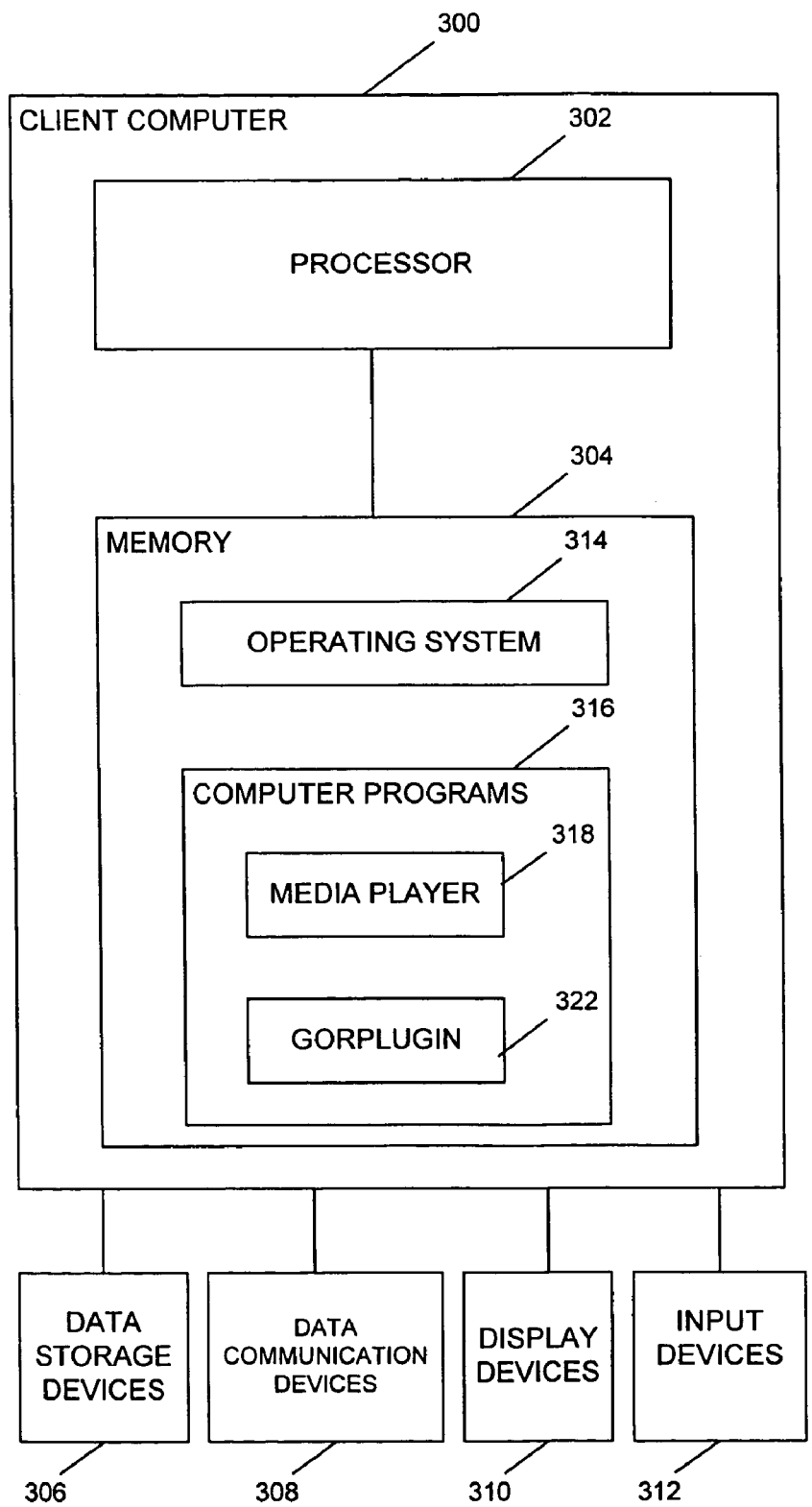
FIG. 3 is a hardware environment used to implement a client computer in one embodiment of the invention.

FIG. 3 is a hardware environment used to implement a client computer in one embodiment of the invention. The present invention is typically implemented using a client computer 300, which generally includes a processor 302, random access memory (RAM) 304, data storage devices 306 (e.g., hard, floppy, and/or CD-ROM disk drives, etc.), data communications devices 308 (e.g., modems, network interfaces, etc.), display devices 310 (e.g., CRT, LCD display, etc.), and input devices 312 (e.g., mouse pointing device, keyboard, and CD-ROM drive). It is envisioned that attached to the client computer 300 may be other devices, such as read only memory (ROM), a video card, bus interface, printers, etc. Those skilled in the art will recognize that any combination of the above components, or any number of different components, peripherals, and other devices, may be used with the client computer 300.

The client computer 300 operates under the control of an operating system (OS) 314. The operating system 314 is booted into the memory 304 of the client computer 300 for execution when the client computer 300 is powered-on or reset. In turn, the operating system 314 then controls the execution of one or more computer programs 316 by the client computer 300. The computer programs 316 comprise an Media Player 318 and a GORPLUGIN 322. The present invention is generally implemented in these computer programs 316, which execute under the control of the operating system 314 and cause the client computer 300 to perform the desired functions as described herein.

The operating system 314 and computer programs 316 are comprised of instructions which, when read and executed by the client computer 300, causes the client computer 300 to perform the steps necessary to implement and/or use the present invention. Generally, the operating system 314 and/or computer programs 316 are tangibly embodied in and/or readable from a device, carrier, or media, such as memory 304, data storage devices 306, and/or data communications devices 308. Under control of the operating system 314, the computer programs 316 may be loaded from the memory 304, data storage devices 306, and/or data communications devices 308 into the memory 304 of the client computer 300 for use during actual operations.

Thus, the present invention may be implemented as a method, apparatus, or article of manufacture using standard programming and/or engineering techniques to produce software, firmware, hardware, or any combination thereof. The term "article of manufacture" (or alternatively, "computer program product") as used herein is intended to encompass a computer program accessible from any computer-readable device, carrier, or media. Of course, those skilled in the art will recognize many modifications may be made to this configuration without departing from the scope of the present invention.

Those skilled in the art will recognize that the environment illustrated in FIG. 3 is not intended to limit the present invention. Indeed, those skilled in the art will recognize that other alternative hardware environments may be used without departing from the scope of the present invention.

Figure 4:
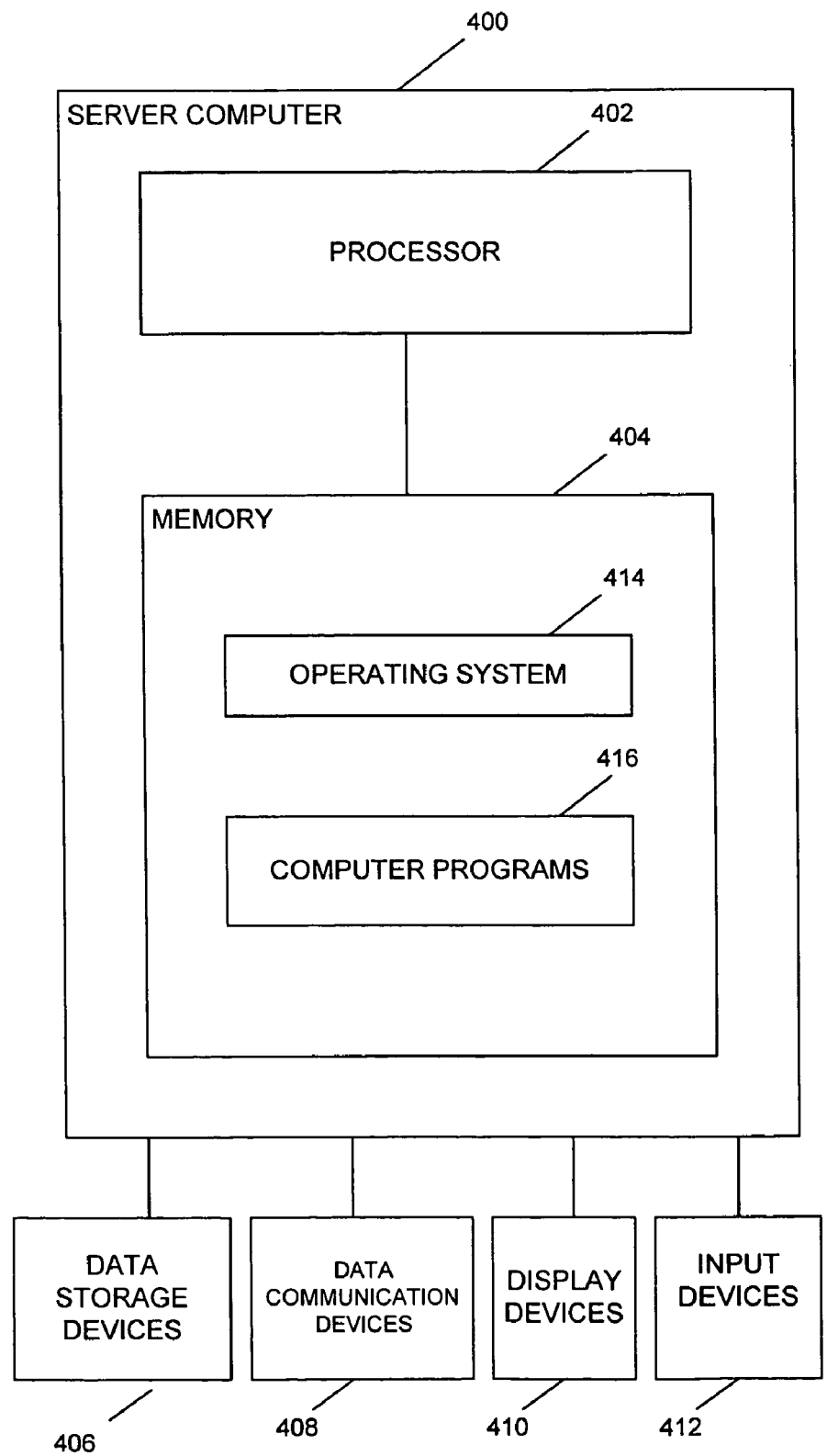
FIG. 4 is a hardware environment used to implement a server computer in one embodiment of the invention.

FIG. 4 is a hardware environment used to implement a server computer in one embodiment of the invention. The present invention is typically implemented using a server computer 400, which generally includes a processor 402, random access memory (RAM) 404, data storage devices 406 (e.g., hard, floppy, and/or CD-ROM disk drives, etc.), data communications devices 408 (e.g., modems, network interfaces, etc.), display devices 410 (e.g., CRT, LCD display, etc.), and input devices 412 (e.g., mouse pointing device and keyboard). The data storage devices 406 store web pages 405. It is envisioned that attached to the server computer 400 may be other devices, such as read only memory (ROM), a video card, bus interface, printers, etc. Those skilled in the art will recognize that any combination of the above components, or any number of different components, peripherals, and other devices, may be used with the server computer 400.

The server computer 400 operates under the control of an operating system (OS) 414. The operating system 414 is booted into the memory 404 of the server computer 400 for execution when the server computer 400 is powered-on or reset. In turn, the operating system 414 then controls the execution of one or more computer programs 416 by the server computer 400. The present invention is generally implemented in these computer programs 416, which execute under the control of the operating system 414 and cause the server computer 400 to perform the desired functions as described herein.

The operating system 414 and computer programs 416 are comprised of instructions which, when read and executed by the server computer 400, causes the server computer 400 to perform the steps necessary to implement and/or use the present invention. Generally, the operating system 414 and/or computer programs 416 are tangibly embodied in and/or readable from a device, carrier, or media, such as memory 404, data storage devices 406, and/or data communications devices 408. Under control of the operating system 414, the computer programs 416 may be loaded from the memory 404, data storage devices 406, and/or data communications devices 408 into the memory 404 of the server computer 400 for use during actual operations.

Thus, the present invention may be implemented as a method, apparatus, or article of manufacture using standard programming and/or engineering techniques to produce software, firmware, hardware, or any combination thereof. The term "article of manufacture" (or alternatively, "computer program product") as used herein is intended to encompass a computer program accessible from any computer-readable device, carrier, or media. Of course, those skilled in the art will recognize many modifications may be made to this configuration without departing from the scope of the present invention.

Those skilled in the art will recognize that the environment illustrated in FIG. 4 is not intended to limit the present invention. Indeed, those skilled in the art will recognize that other alternative hardware environments may be used without departing from the scope of the present invention.

Figure 5:
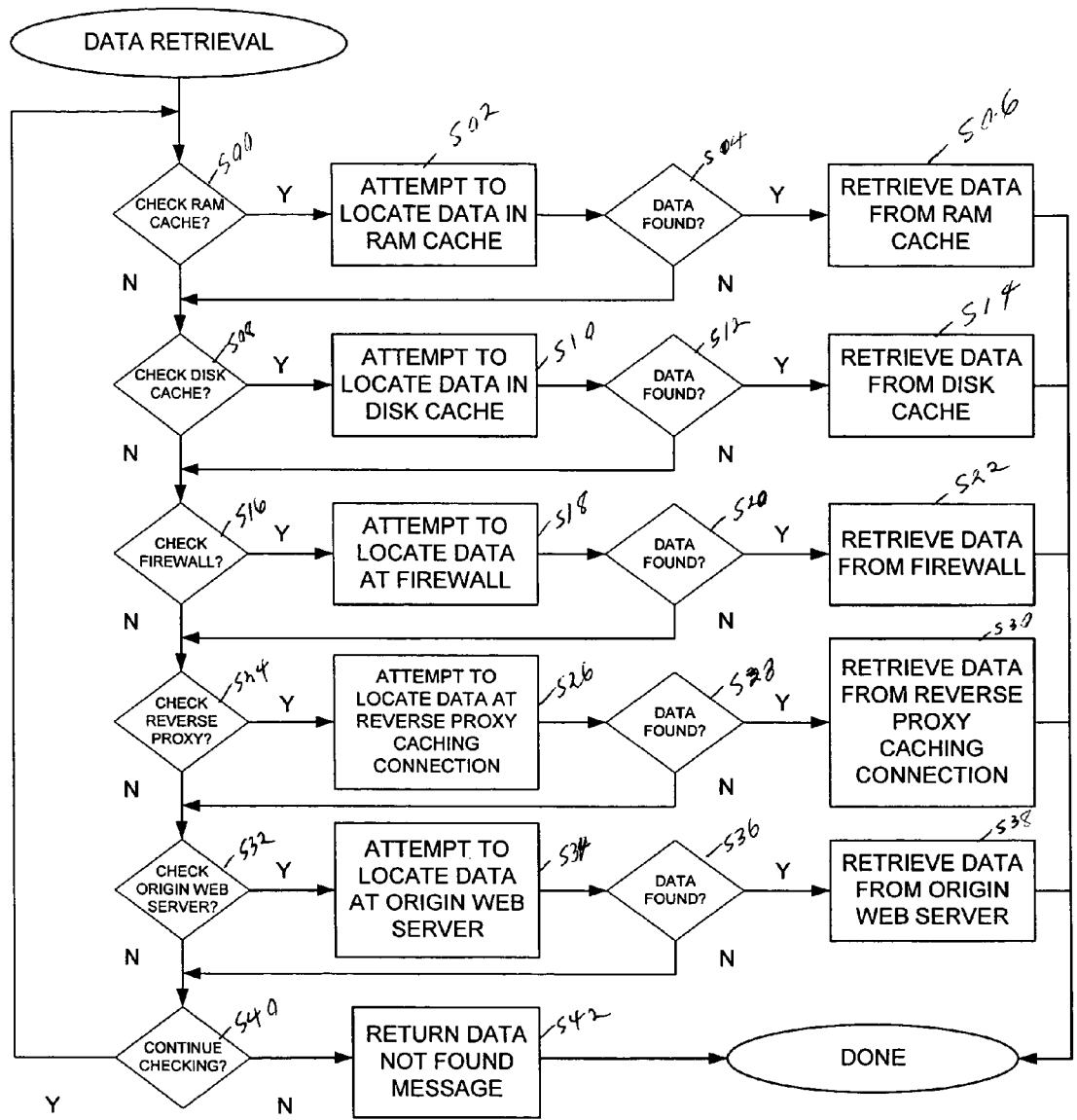
FIG. 5 illustrates a flow diagram of a process for data retrieval in one embodiment of the invention.

FIG. 5 illustrates a flow diagram of one process for data retrieval in one embodiment of the invention. In this flow diagram, each of the caches may be checked in any order, zero or more times. One skilled in the art would recognize that many data retrieval scenarios are possible. In block 500, the data retrieval system of the invention determines whether to check for data in a RAM cache. If so, the data retrieval system continues to block 502, otherwise, the data retrieval system continues to block 508. In block 502, the data retrieval system of the invention attempts to locate data in a RAM cache. In block 504, the data retrieval system determines whether the data was found. If so, the data retrieval system continues to block 506 to retrieve data from the RAM cache, otherwise, the data retrieval system continues to block 508.

In block 508, the data retrieval system of the invention determines whether to check for data in a disk cache. If so, the data retrieval system continues to block 510, otherwise, the data retrieval system continues to block 516. In block 510, the data retrieval system attempts to locate data in a disk cache. In block 512, the data retrieval system determines whether the data was found. If so, the data retrieval system continues to block 514 to retrieve data from the disk cache, otherwise, the data retrieval system continues to block 516.

In block 516, the data retrieval system of the invention determines whether to check for data at a firewall. If so, the data retrieval system continues to block 518, otherwise, the data retrieval system continues to block 524. In block 518, the data retrieval system attempts to locate data at a firewall. In block 520, the data retrieval system determines whether the data was found. If so, the data retrieval system continues to block 522 to retrieve data from the firewall, otherwise, the data retrieval system continues to block 524.

In block 524, the data retrieval system of the invention determines whether to check for data at a reverse proxy caching connection. If so, the data retrieval system continues to block 526, otherwise, the data retrieval system continues to block 532. In block 526, the data retrieval system of the invention attempts to locate data at a reverse proxy caching connection. In block 528, the data retrieval system determines whether the data was found. If so, the data retrieval system continues to block 530 to retrieve data from the reverse proxy caching connection, otherwise, the data retrieval system continues to block 532.

In block 532, the data retrieval system of the invention determines whether to check for data at an origin web server. If so, the data retrieval system continues to block 534, otherwise, the data retrieval system continues to block 540. In block 534, the data retrieval system of the invention attempts to locate data at an origin web server. In block 536, the data retrieval system determines whether the data was found. If so, the data retrieval system continues to block 538 to retrieve data from the origin web server, otherwise, the data retrieval system continues to block 540

In block 540, the data retrieval system of the invention determines whether to continue checking for data. If so, the data retrieval system loops back to block 500, otherwise, the data retrieval system continues to block 542 and returns an indication that the data was not found.

There are many advantages to the data retrieval system of the present invention. The use of reverse proxy caching connections leads to "hyper-scalability" (i.e., a system may be scaled very quickly to user a large number of reverse proxy caching connections). The data retrieval system provides faster time than many conventional real-time streaming systems. The data retrieval system is efficient in that it avoids accessing web servers, which is a very expensive operation. The data retrieval system works in different hardware configurations, including portable devices (e.g., a personal digital assistant).

Moreover, in one embodiment, the data retrieval system supports variable Quality of Service (QOS), which refers to guaranteeing a throughput level. A throughput level is an amount of data that can be transferred in a specified amount of time. In particular, one embodiment uses transmission control protocol (TCP), which guarantees delivery of data and also guarantees that packets will be delivered in the same order in which they were sent. On the other hand, some conventional systems use user datagram protocol (UDP), which provides few error recovery service and is generally best for broadcast messages.

The data retrieval system is also advantageous because it supports digital rights management (e.g., rights to songs) and it is platform independent (e.g., it uses Internet protocols for communication between systems and any media player may be used). Furthermore, there is "out of band data store filling". Thai is, data may be stored in a client-side cache via portable media (e.g., a compact disc), via file transfer protocol (FTP) or other Internet protocol, or from a broadcast signal from a satellite to a receiver at the client. The data retrieval system also will retrieve a data element from a playlist, and, while that data element is being played, the data retrieval system will retrieve other data elements, which is an efficient use of resources.

The data retrieval system is also advantageous in that only the GORPLUG program is downloaded, and there are no other download requires (i.e., the data retrieval system leverages RealPlayer® G2 from RealNetworks or Netshow 3.0 from Microsoft business decisions). The data retrieval system works through firewalls and scales to support broadband users. Moreover, the data retrieval system has no "inter-clip" gaps. The infrastructure is codec (compressor/decompressor) agnostic.

The data retrieval system allows for "better than bandwidth" content (i.e., higher quality stingers, ads, and content). This is possible because the data retrieval system recognizes whether a cached data element is higher or lower quality. If a higher quality version of the data element can be retrieved, the data retrieval system retrieves it, preferably while other data elements are being played to avoid any disruptions to the user. The data retrieval system leverages broadcast infrastructure/off-peak bandwidth to obtain data elements.

The data retrieval system also supports "rush crowds" with on-air promotions to avoid bad first impressions. Also, the data retrieval system supports a large number of concurrent users (i.e., the GORPLUG program is a "sticky application").

The data retrieval system uses commodity reverse proxies and web servers JIT bandwidth. The data retrieval system is multicast ready and can leverage digital TV broadcast. Moreover, the data retrieval system has second level caching that smooths out Internet congestion. The data retrieval system supports "instant download" to portable media players. Also, the data retrieval system supports a "next track"/"fast forward" feature. The data retrieval system can intelligently cover Internet outages. The data retrieval system also supports time domain mixed encodings (i.e., switches encodings on-the-fly (e.g., G2, MP3, G2)).

User Interface for Accessing Music

One aspect of the invention provides a user interface for accessing music. In this section, for ease of reference, the invention will be referred to as a music system. This section will describe one embodiment of the user interface and the options that are provided for a user to rate music and customize music categories.

Initially, a user accesses a specified web site (e.g., go.com). The user may be either a guest (e.g., a first time user of that web site) or a registered user (i.e., someone who has accessed the web site and provided registration information). When a user logs in, the music system determines whether the user is a guest or a registered user by looking for registration information stored on the user's computer by the music system. In one embodiment, the registration information is a cookie (i.e., a message provided by a server to a browser containing information identifying a user). When the user accesses the web site, the cookie is forwarded to the music system at the web site. If a cookie is forwarded to the music system, the music system displays a home page customized to the user (e.g., the home page may list the user-created stations). If a cookie is not forwarded to the music system, the music system displays a home page that includes a "sign in" control to enable a user to register.

Additionally, the music system determines whether the user's computer has the GORPLUG program. If not, the music system automatically downloads the GORPLUG program to the user's computer. Then, the music system determines whether the user's computer has an appropriate media player. If not, the music system enables a user to download the appropriate media player. Once this is done, the user may select a category of music (e.g., Top Hits) to view sub-categories of music or to view stations (i.e., existing radio stations or user-created stations). Then a user may make further selections to listen to desired music. The music system also provides music and other news and enables a user to perform other tasks, such as shopping or playing games via the web site.

Figure 6:
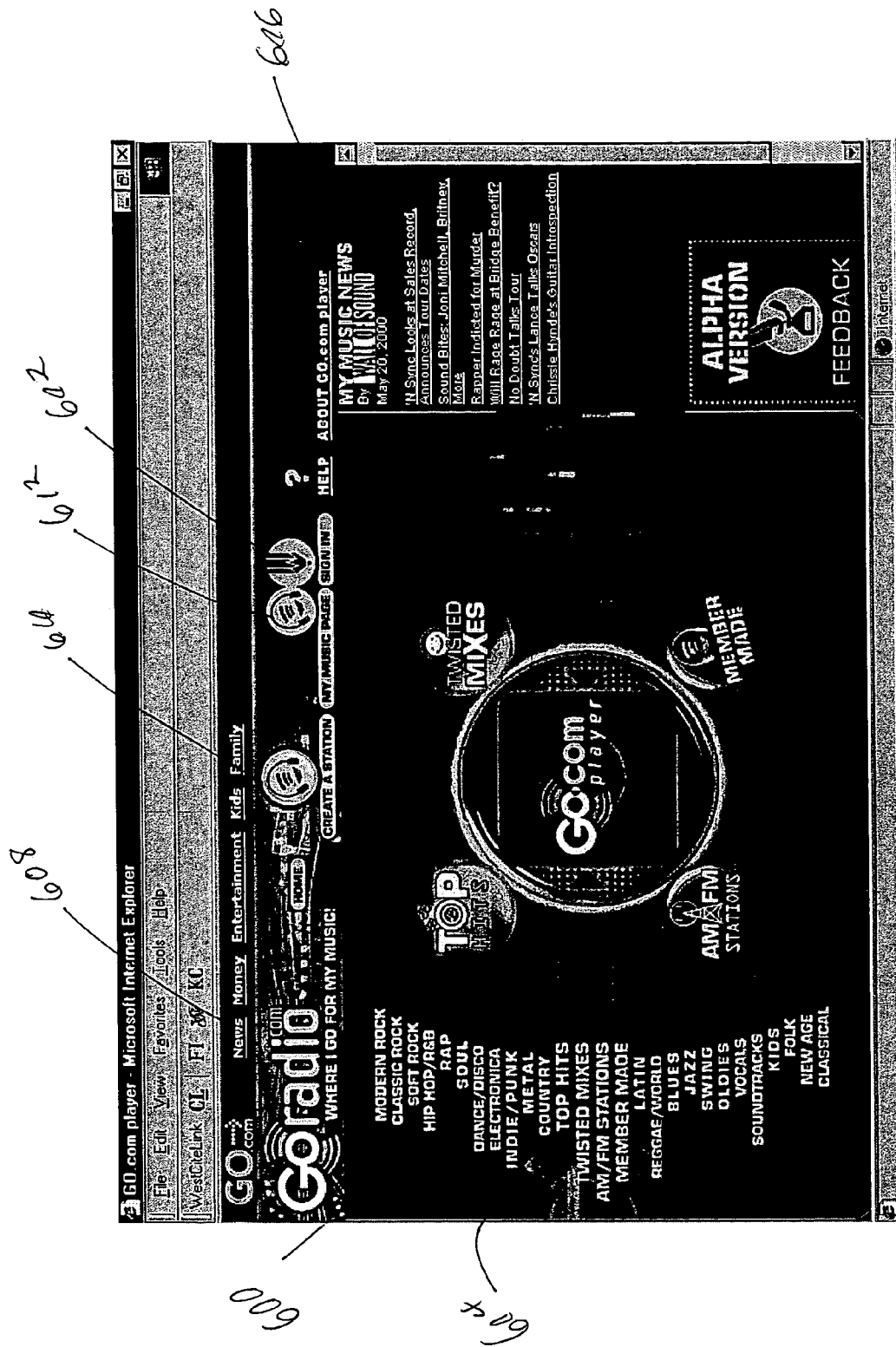
FIG. 6 illustrates a web page that may be displayed to a user upon accessing a web site to obtain music.

As mentioned above, initially, a user accesses a web site supported by the music system. FIG. 6 illustrates a web page 600 that may be displayed to a user upon accessing a web site to obtain music. The web page 600 includes a Sign In control 602 for "signing in". When a user "signs in", the music system retrieves previously stored information about that user, such as the user's preferences for music. The web page 600 also provides music categories 604. When a user selects a music category 604 (e.g., Top Hits), the music system plays music from that music category 604. Moreover, a user may read articles on music news 606 by selecting the articles. The web page 600 enables a user to access other types of information (e.g., news, shopping items, and health information) by selecting an information category 608 (i.e., News, Money, Entertainment, Kids, or Family). Furthermore, the music system enables users to create their own stations by selecting a Create a Station control 610. Then, a user may view their created stations or music they have specified as their favorites by selecting a My Music Page control 612.

Figure 7:
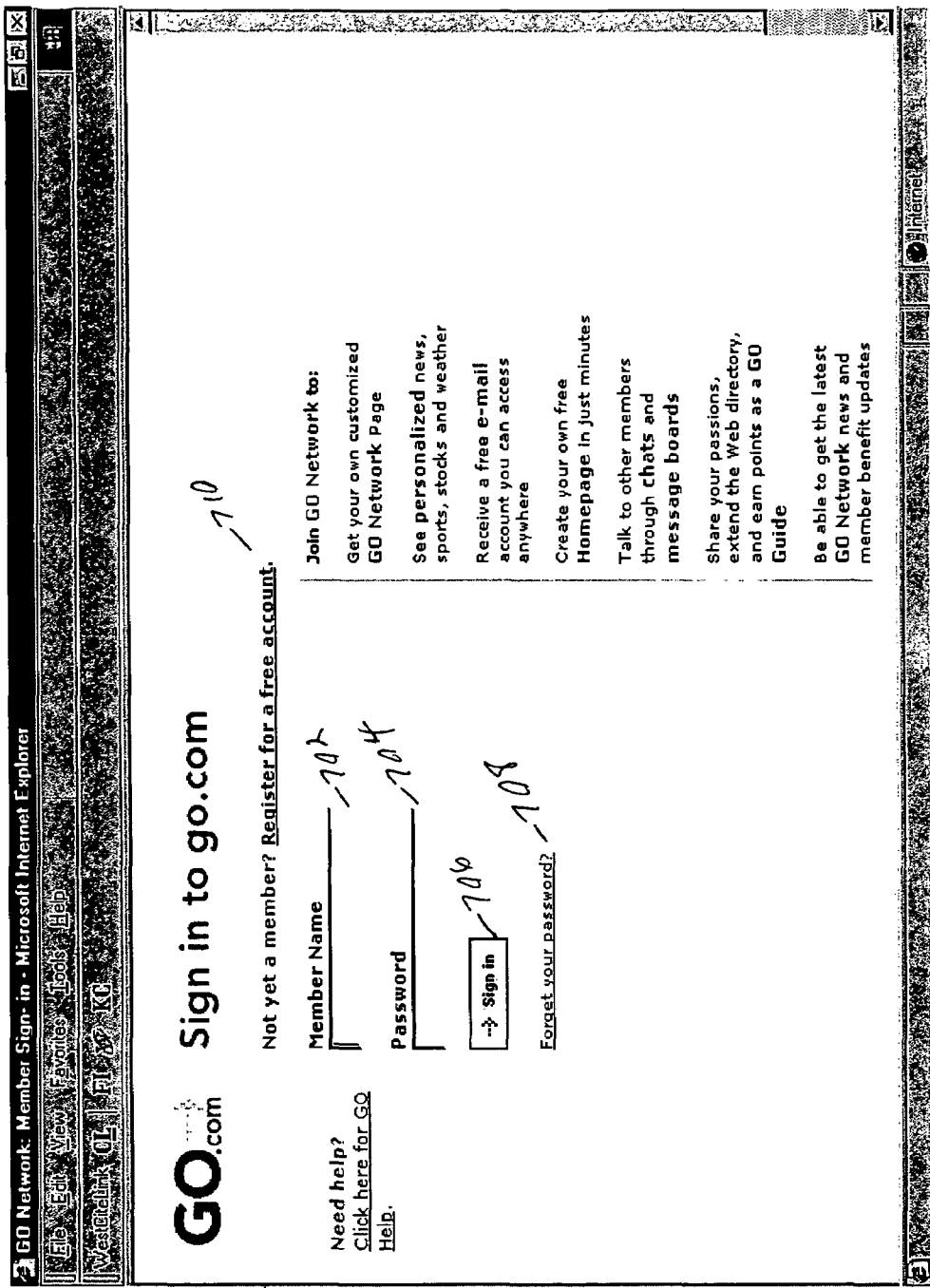
FIG. 7 illustrates a web page that may be displayed to a user in response to selection of a Sign In control.

FIG. 7 illustrates a web page 700 that may be displayed to a user in response to selection of a Sign In control 602. If a user has already registered, the web page 700 obtains a member name 702 and password 704 from the user, and the user selects the Sign in control 706 to "sign in" the user. If the member name 702 and password 704 are found to be valid, the music system enables the user to access music, news, and other information. If a user has forgotten a password, the user may select the Forget your password control 708. If the user does not have a member name and password (i.e., the user has not previously registered, the user may select the Register for a free account control 710.

Figure 8:
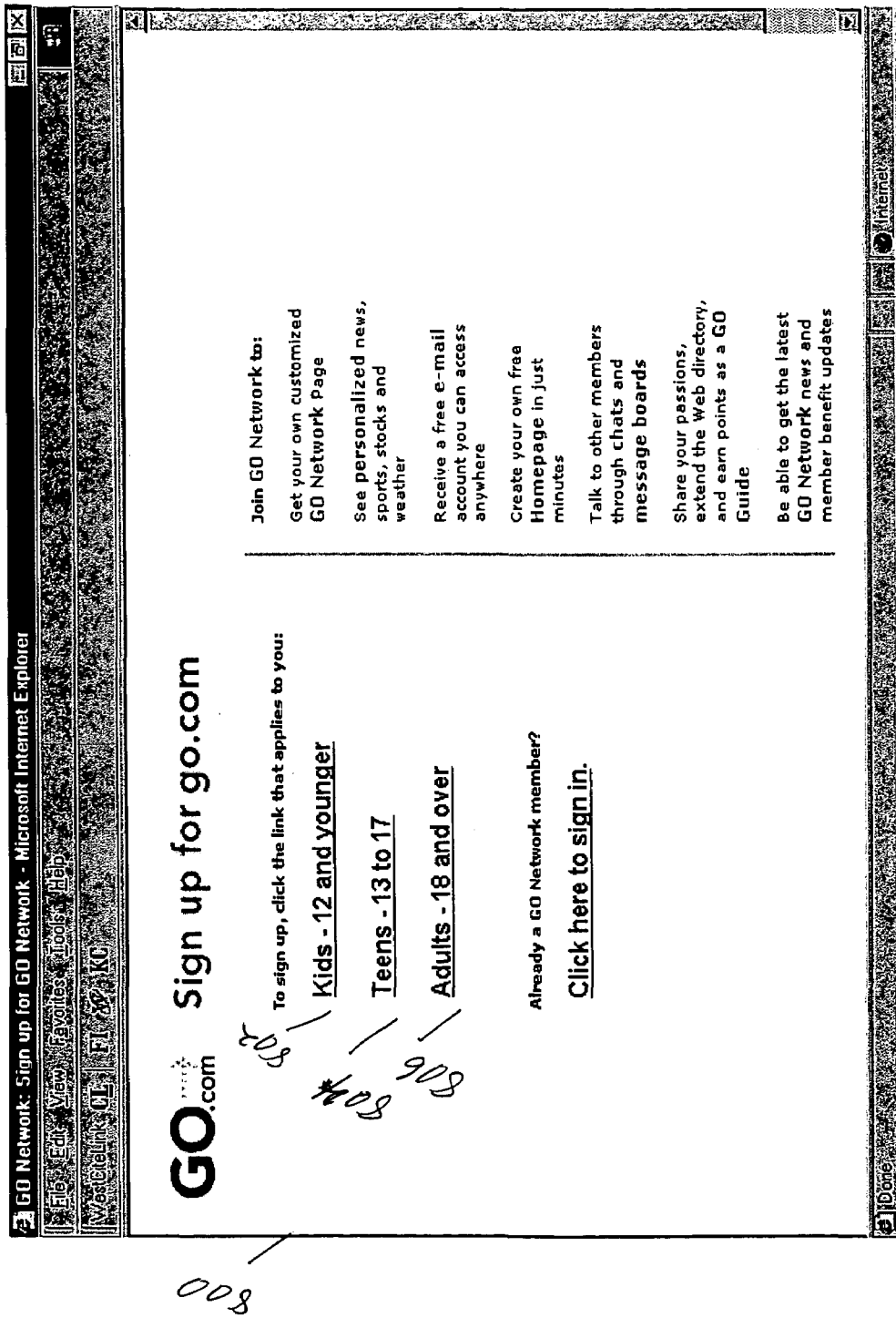
FIG. 8 illustrates a web page that may be displayed to a user in response to selection of a Register for a free account control.

FIG. 8 illustrates a web page 800 that may be displayed to a user in response to selection of a Register for a free account control 710. The web page 800 enables a user to select one of several age categories, Kids 802, Teens 804, or Adults 806. Then, the music system displays a form to collect information from the user. The information collected varies based on the age category that was selected.

Figure 9A:
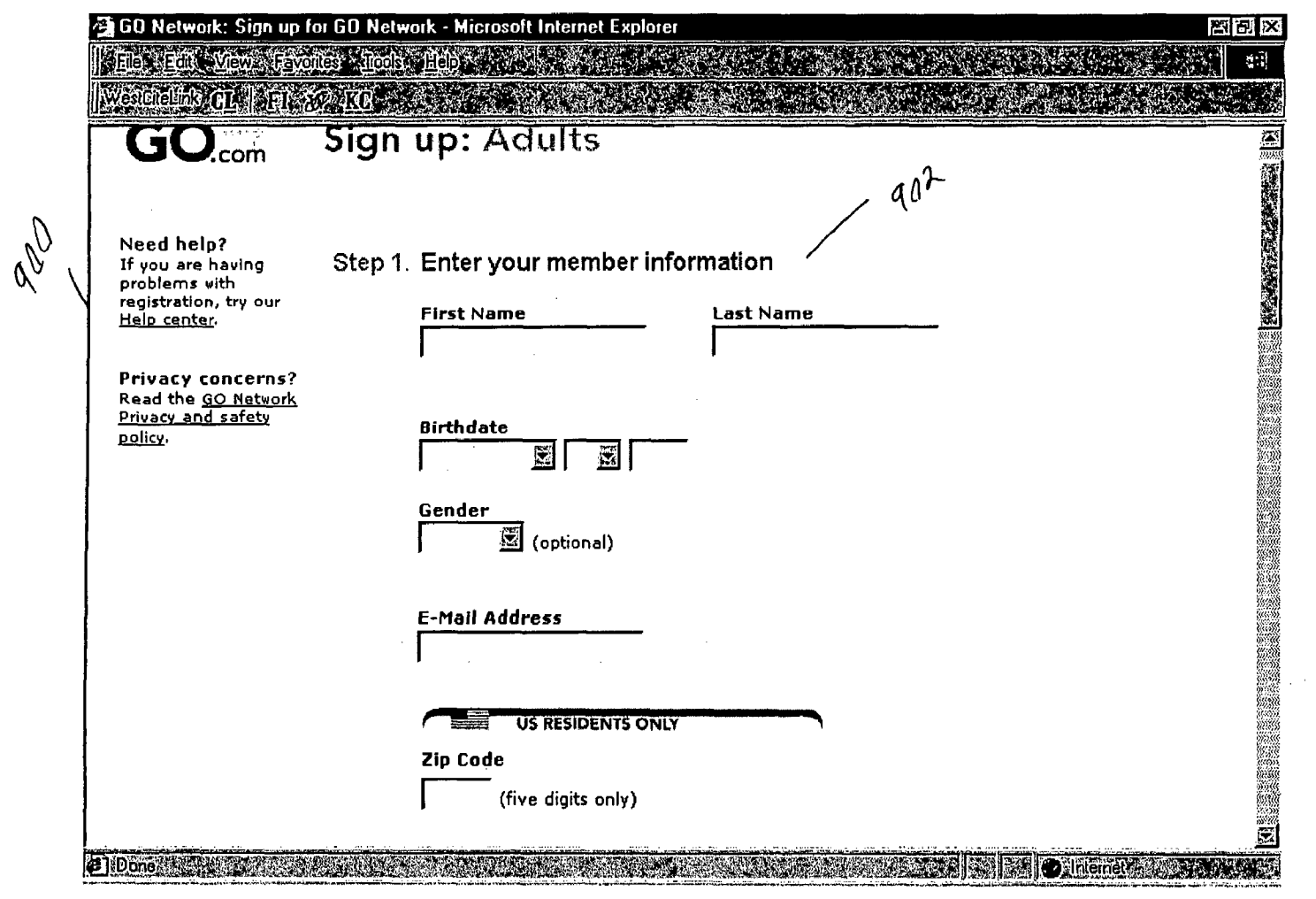
Figure 9B:
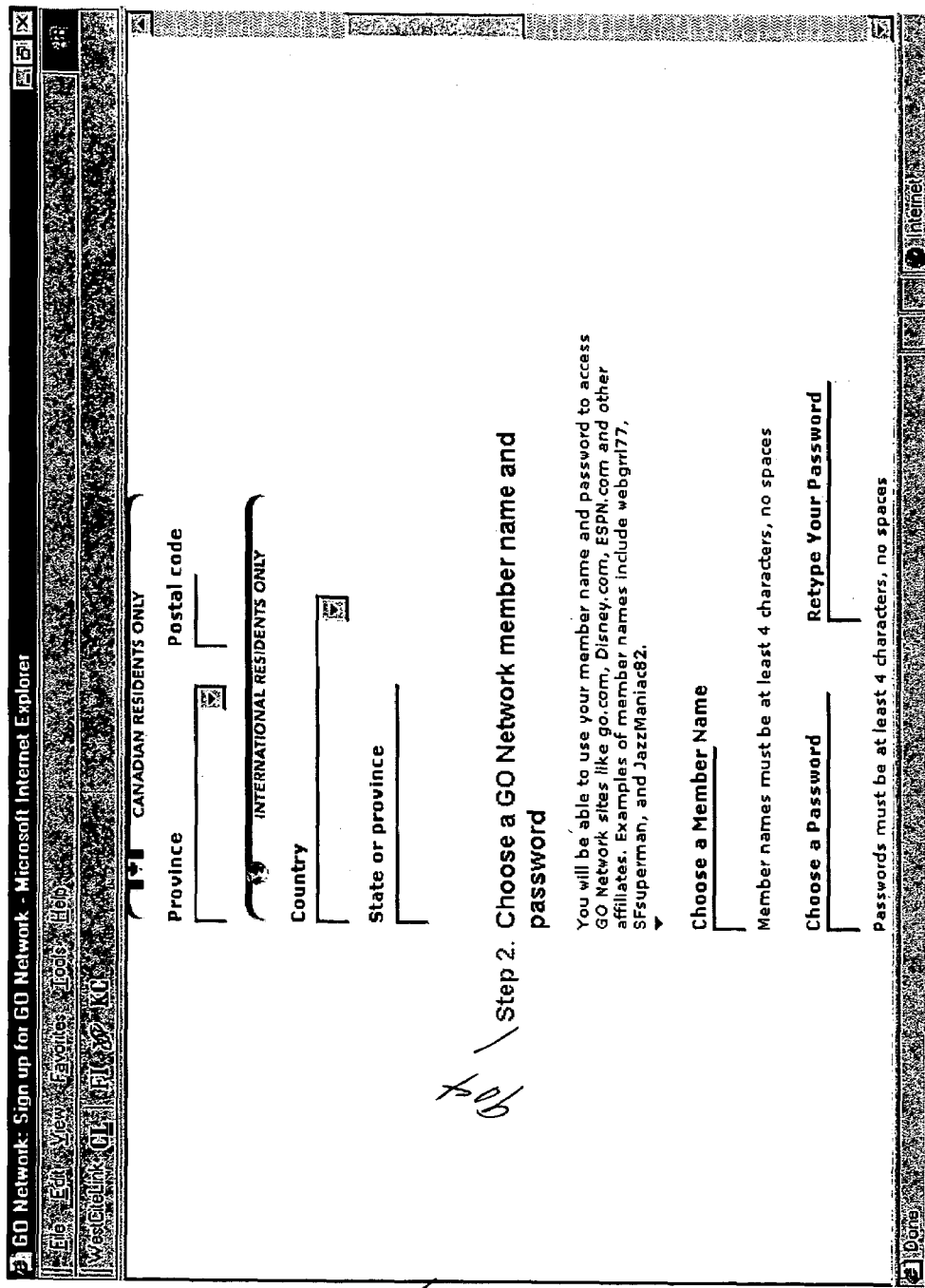

As an example, the age category for Adults 802 has been selected. FIGS. 9A-9D illustrate a web page 900 that is illustrated upon selection of the age category for Adults 802. Although the web page is illustrated using four sheets of figures, it is to be understood that one web page 900 contains the information displayed in FIGS. 9A-9D, and a user may use a scroll bar to scroll to different portions of the web page 900. In FIG. 9A, a user is asked to enter user profiling data in Step1 902, including a name, birthdate, gender, and an e-mail address. It is to be noted that selection of the age categories for Kids 802 and Teens 804 also request a parent's e-mail address. As shown in FIGS. 9A and 9B, the web page 900 also requests information from an adult of a zip code for a U.S. resident and other information from residents living outside of the U.S. Additionally, the web page 900 asks a user to select a member name and password in Step2 904. Once this is selected, the user would enter this information to "sign in".

Figure 9C:
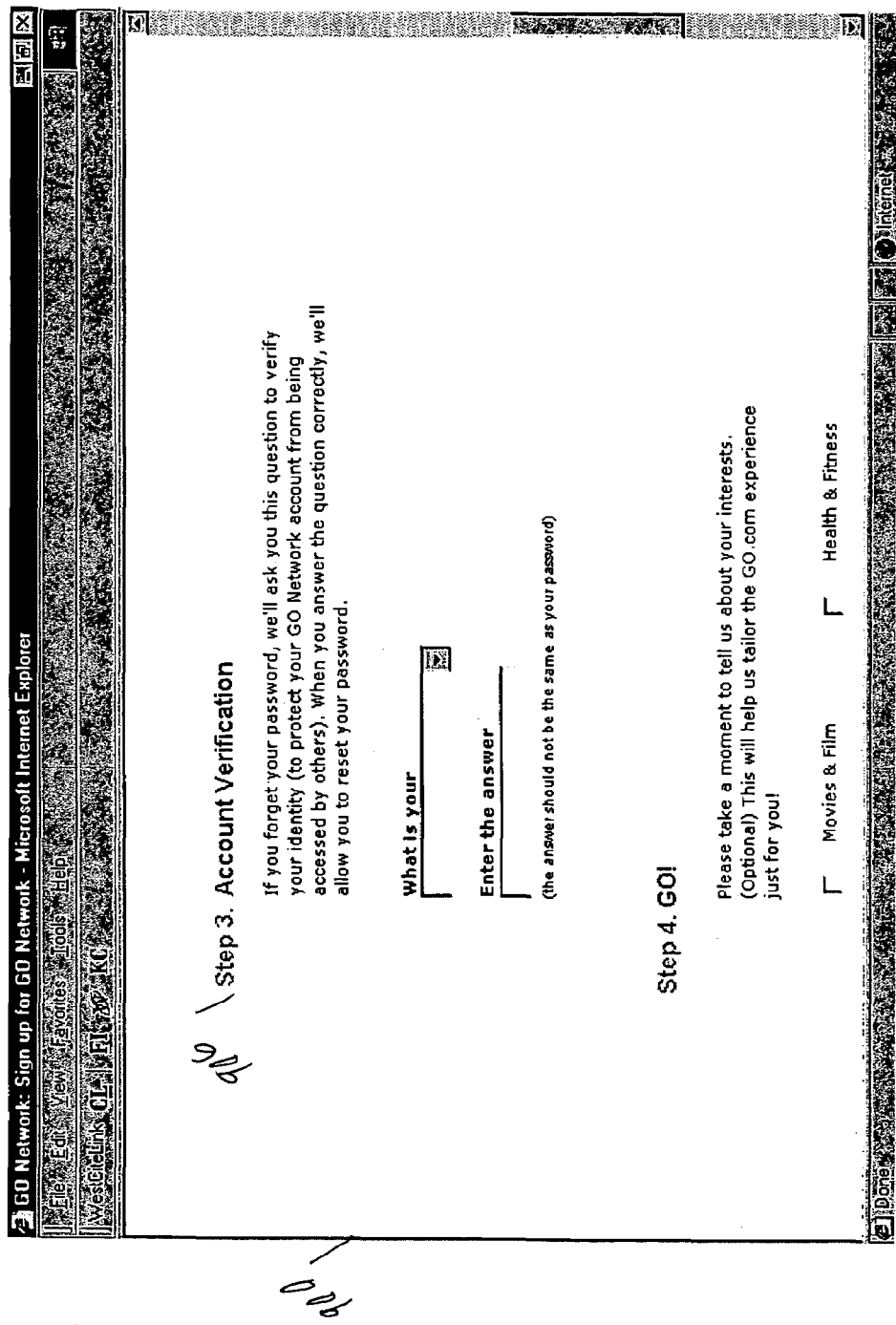
Figure 9D:
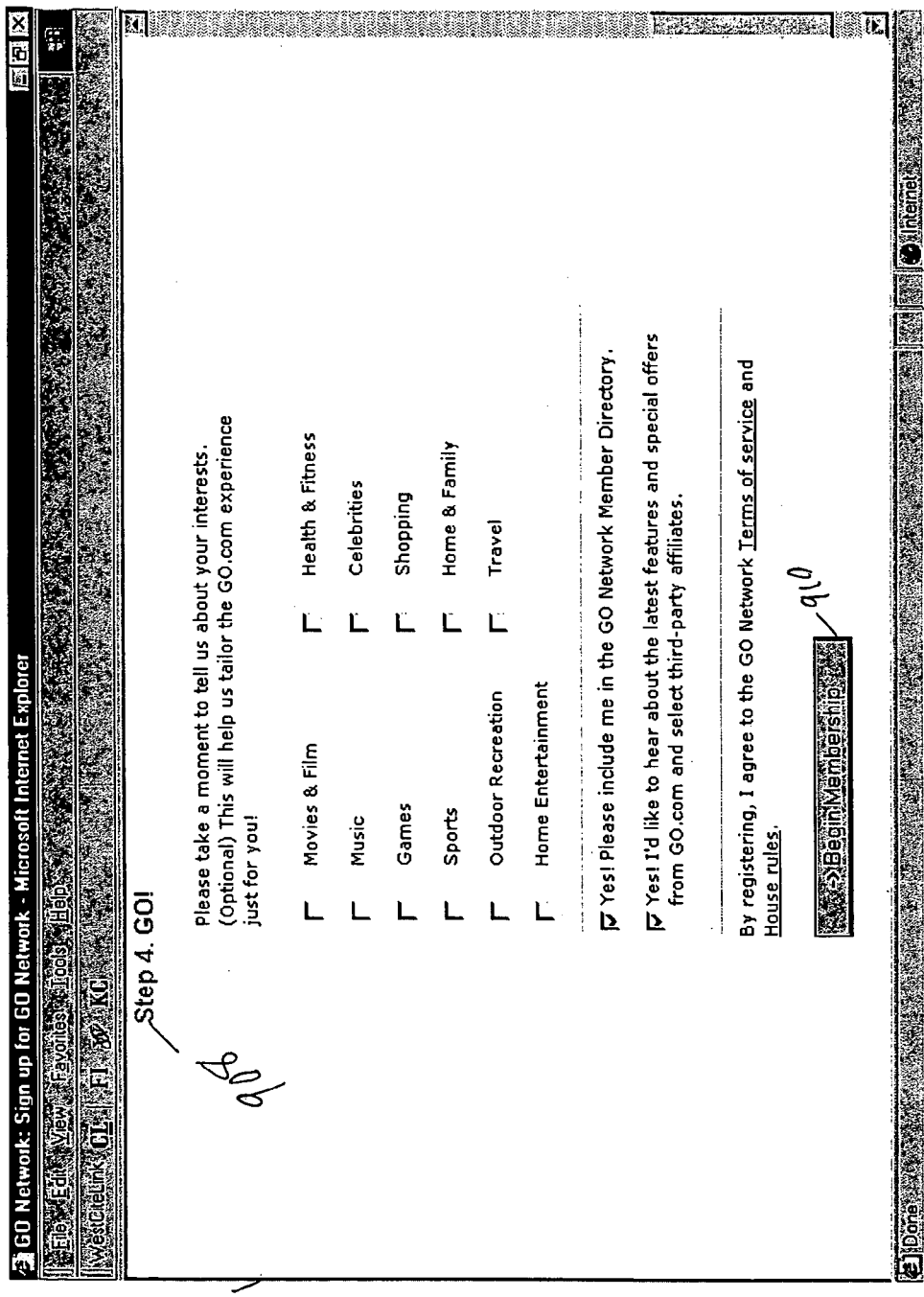

The web page 900, as can be seen in FIG. 9C, request account verification information in Step3 906. The account verification information will be requested in response to a user selecting the Forget your password control 708 of FIG. 7. The account verification information enables a user to select the topic of a question beginning with "What is your", and the topic may be a pet's name, a place of birth, a family member's name, or a mother's maiden name: Step4 908 of web page 900, shown in FIG. 9D, requests an adult user to enter information on interests. Note that this information is not asked of Kids or Teens. A user may select the Begin Membership control 910 to complete registration.

Figure 10:
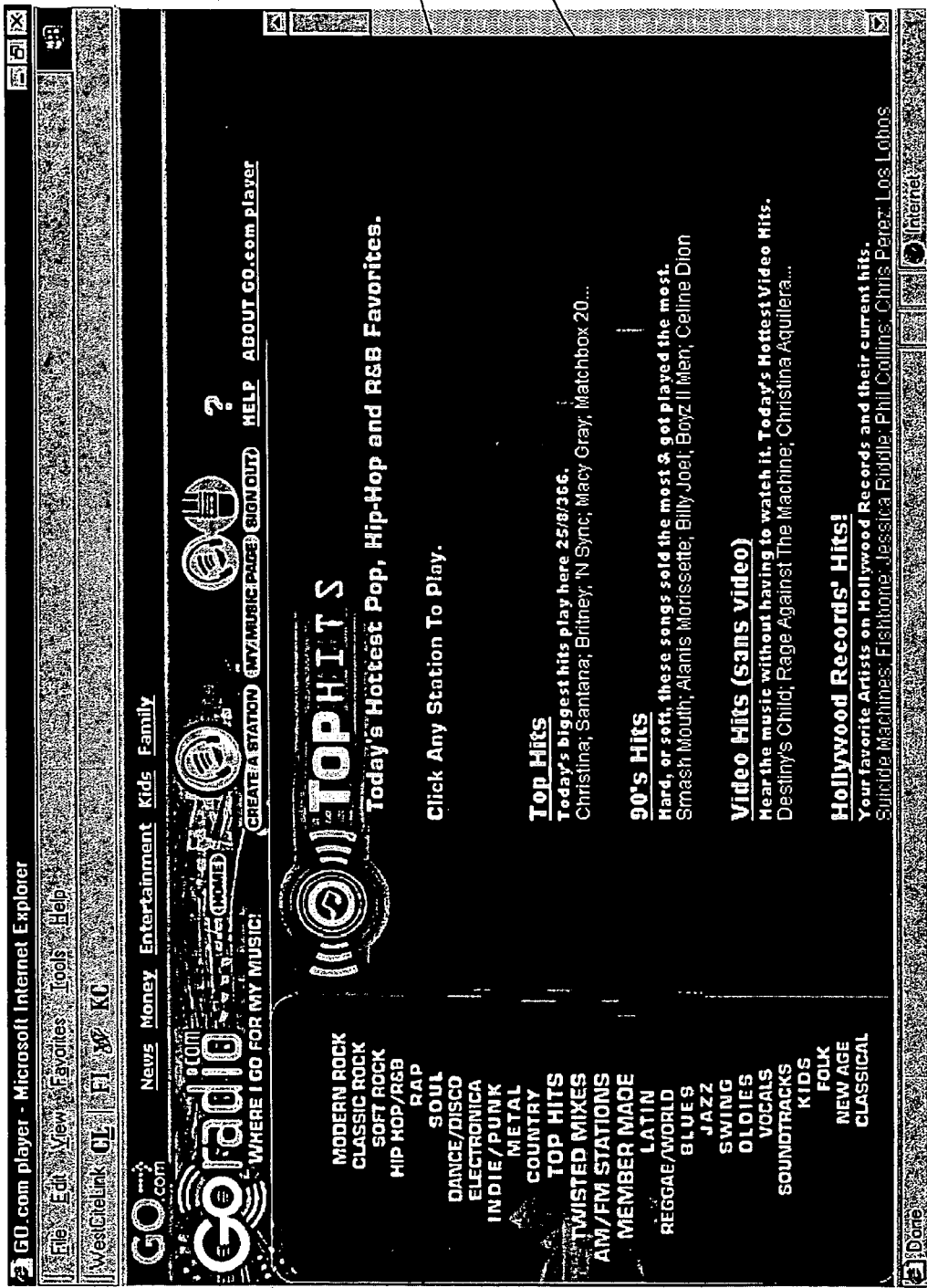
FIG. 10 illustrates a web page that may be displayed to a user in response to selection of a music category of Top Hits.

Once a user registers and/or signs in, the music system displays a "home" page (i.e., the first page of the web site) such as web page 600 of FIG. 6. The music system provides a unique interface to allow a user to access music. In particular, a user may select a music category of Top Hits. Upon this selection, a list of sub-categories 1002 that fall under the music category of Top Hits is displayed. For example, FIG. 10 illustrates a web page 1000 that may be displayed to a user in response to selection of a music category of Top Hits. A user may select a sub-category 1002 to listen to music that falls in that sub-category. For this example, the sub-category of Top Hits 1004 has been selected.

Figure 11:
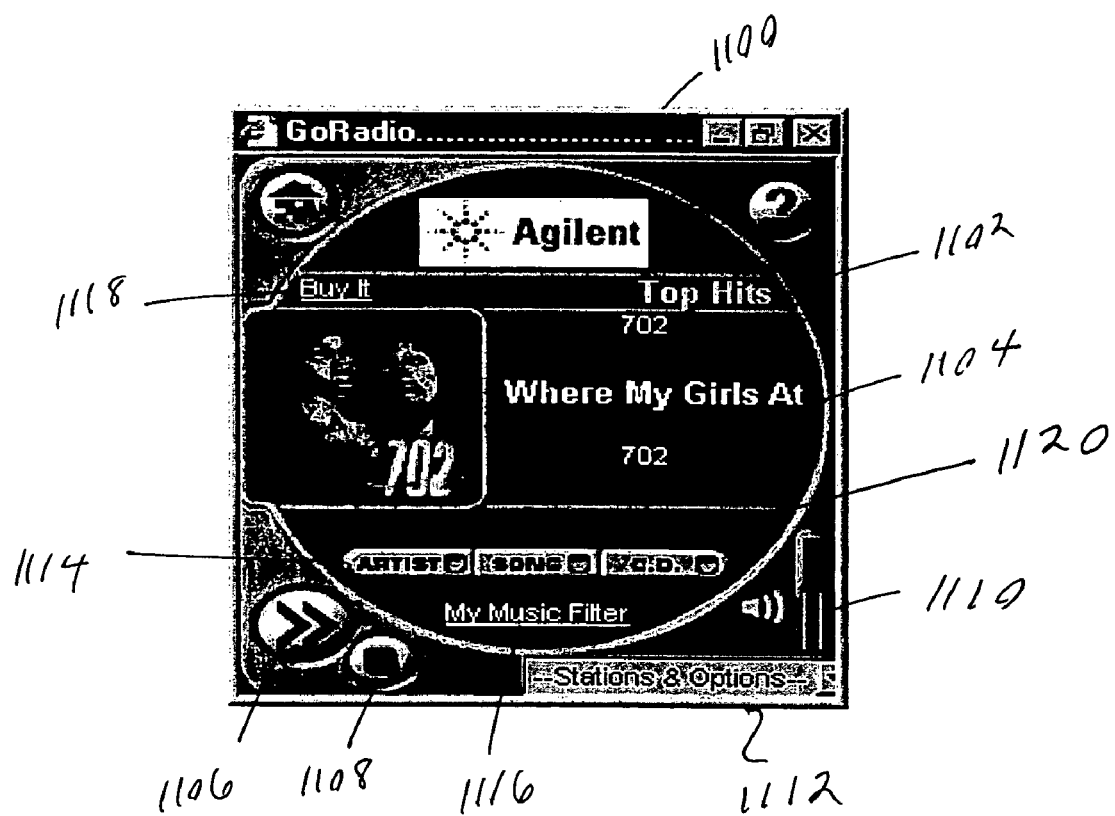
FIG. 11 illustrates a music controller that is displayed to a user in response to selection of a music sub-category of Top Hits.

When a user selects a music category, the music system displays a music controller, such as music controller 1100 illustrated in FIG. 11. Initially, the music controller is blank, but when a sub-category is selected, information is displayed in the music controller 1100. The music controller 1100 has one or more metadata areas for displaying metadata: The metadata may be displayed in dynamic form (e.g., it scrolls across music controller 1100) or it may be displayed in static form (e.g., it does not change form once displayed). For example, the music controller 1100 identifies the music sub-category 1102 and the music 1104 (e.g., song) that is playing. Moreover, a track control 1106 enables a user to move to another track (i.e., other music) in the selected music sub-category. A pause control 1108 enables pausing music, and a volume control 1110 allows for adjustment of volume. A user may see a drop down list of Stations and Options 1112 to listen to other music. A user may determine how often an artist, song, or C.D. (compact disc) is played using a frequency control 1114.

Figure 12:
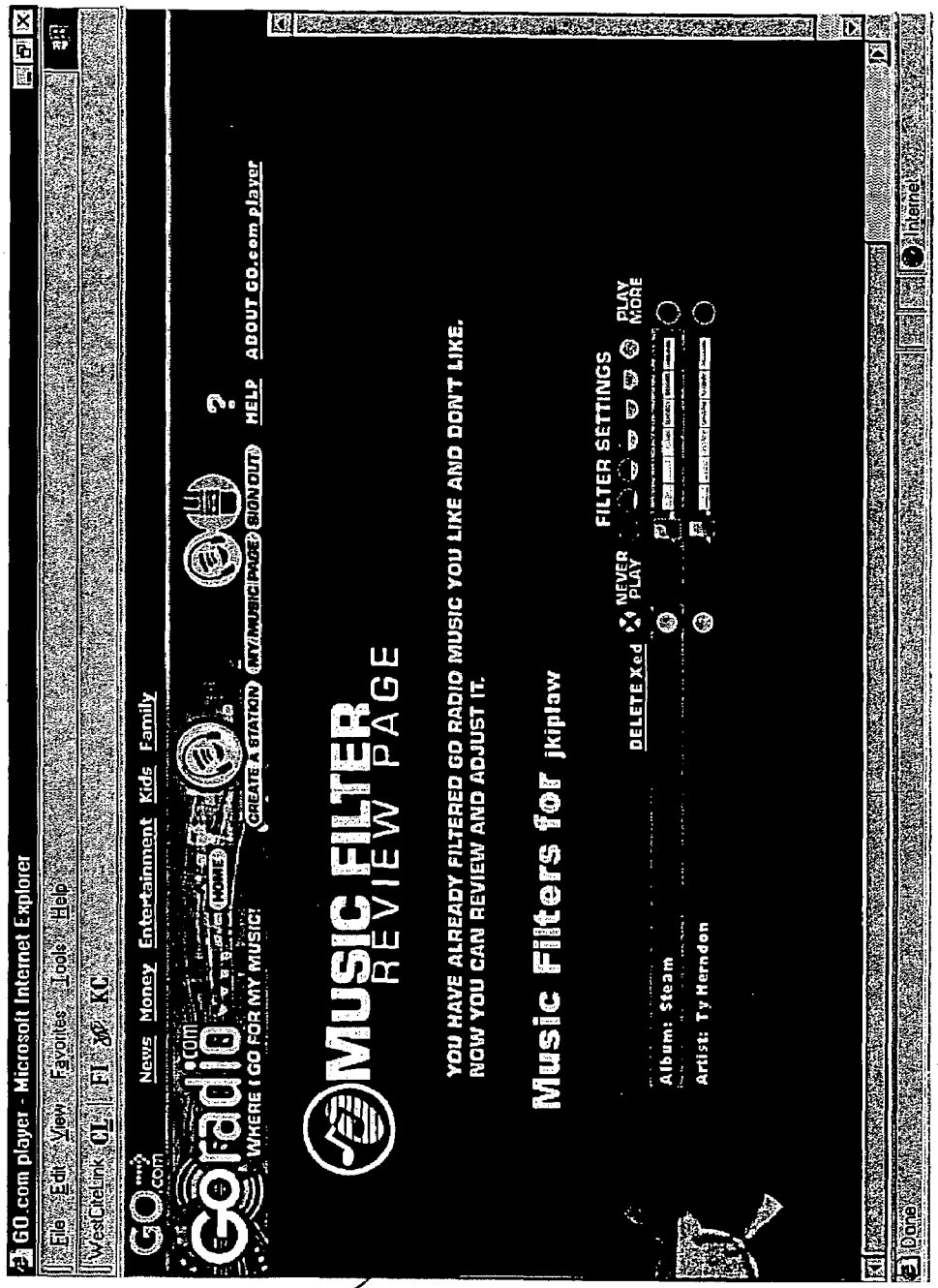
FIG. 12 illustrates a web page that is displayed to a user in response to selection of a My Music Filter control.

In one embodiment, the My Music Filter control 1116 displays a Music Filter web page, such as web page 1200 of FIG. 12. The web page 1200 enables a user to review their music filters (i.e., indications of how frequent music should be played) and adjust them. That is, the music filter enables a user to modify a station. In one embodiment, a music filter that is created is always applied. In other embodiments, the music filter may be turned on/off by a user or system administrator. Furthermore, the music controller 1100 displays a Buy It control 1118 that enables a user to purchase the music that is currently playing. A metadata area 1120 may be used to display additional metadata, although, in this case, no metadata is displayed in metadata area 1120. It is to be understood that any of the user interface web pages may include one or more metadata areas, although it is explicitly discussed with respect to FIG. 11. Additionally, the background image displayed in the music controller may be modified to reflect the type of music being played.

Figure 13:
FIG. 13 illustrates a web page that may be displayed to a user in response to selection of a music category of Twisted Mixes.
Figure 14:
FIG. 14 illustrates a music controller that is displayed to a user in response to selection of a music sub-category of They Fought The Law.

As a further example, FIG. 13 illustrates a web page 1300 that may be displayed to a user in response to selection of a music category of Twisted Mixes. The web page 1300 lists sub-categories 1302 that fall under the music category of Twisted Mixes. For example, one sub-category is They Fought The Law 1304, which plays music by any artist who has had public legal problems. If this category is selected, the music controller background may change to reflect this selection. FIG. 14 illustrates a music controller 1400 that is displayed to a user in response to selection of a music sub-category of They Fought The Law 1304. In particular, music controller 1400 displays a background 1402 of a jail cell, along with information about the music that is playing in or more metadata areas. For example, the following metadata is displayed: "WALL OF SOUND", "They Fought The Law", "Billy Joel", "The Ballad of Billy The Kid", and "Piano Man". Additionally, metadata area 1404 displays the dynamic (e.g., scrollable or scrolling) metadata: "He was arrested in '92 on". The remaining portion of the metadata is displayed either by automatic scrolling by the invention or by manual scrolling by a user. It is to be understood that any of the user interface web pages may include one or more metadata areas.

Figure 15:
FIG. 15 illustrates a web page that is displayed to a user in response to selection of existing AM/FM stations.

FIG. 15 illustrates a web page 1500 that is displayed to a user in response to selection of existing AM/FM stations. The web page 1500 displays sub-categories 1502 under the music category of AM/FM stations. Example sub-categories 1502 are Contemporary and Country. Under each sub-category, the web page displays particular radio stations that play that sub-category of music. If a user selects an AM/FM station, the "stream" from that station is "streamed" to the user without modifying the stream.

Figure 16A:
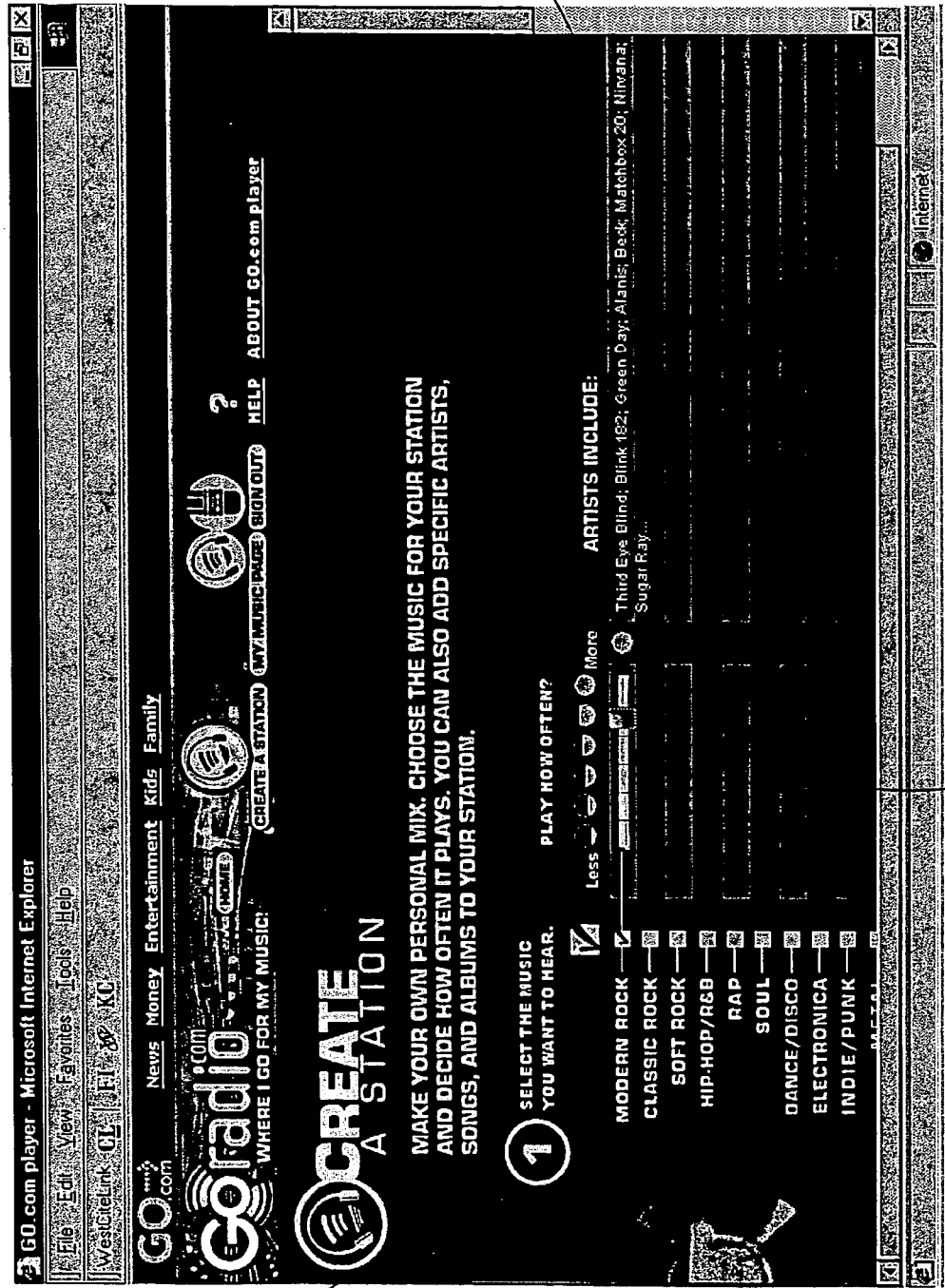
FIGS. 16A-16B illustrate a web page that is displayed in response to user selection of a Create a Station control.
Figure 16B:
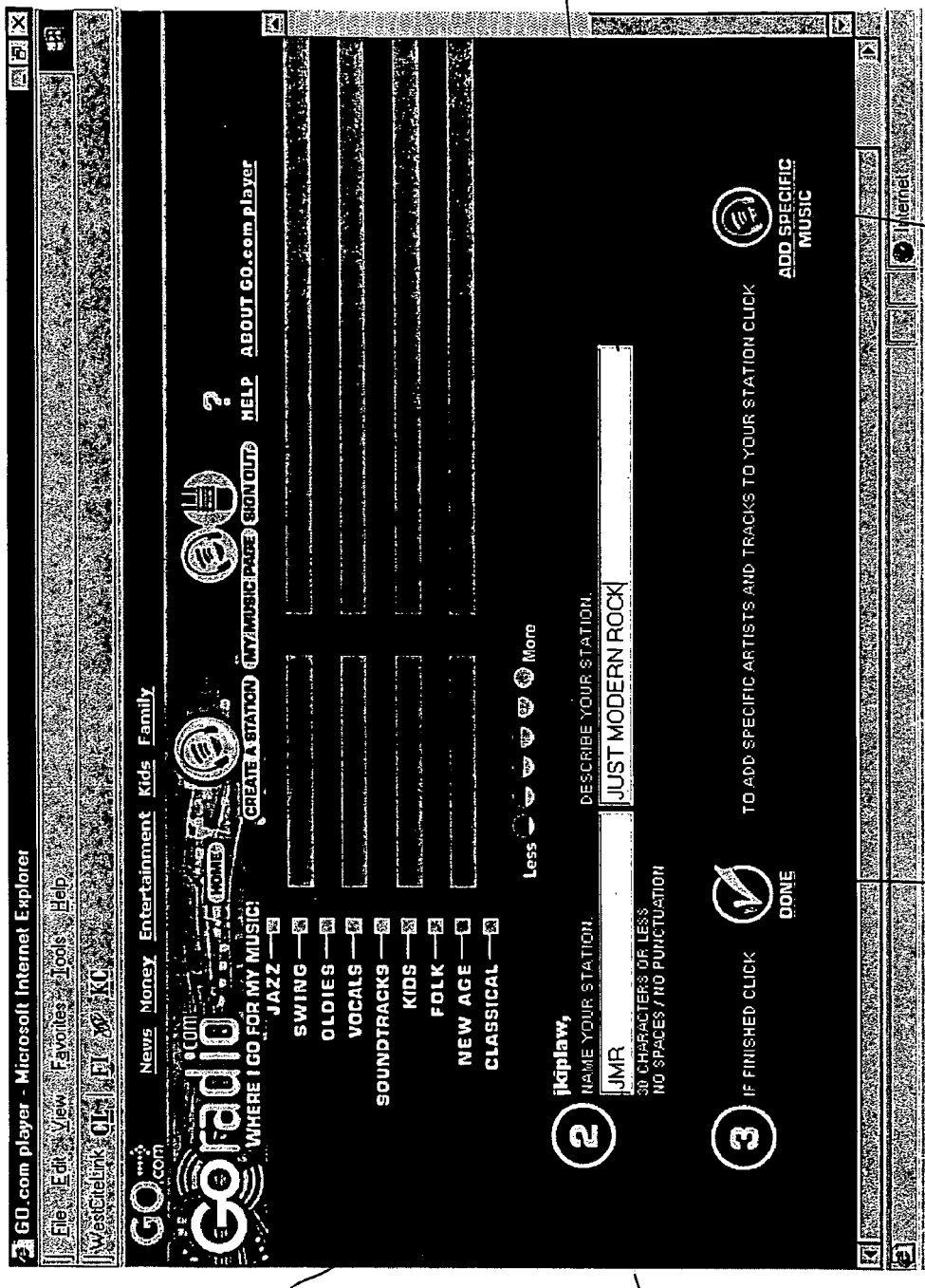

FIGS. 16A-16B illustrate a web page 1600 that is displayed in response to user selection of a Create a Station control. Although the web page is illustrated using two sheets of figures, it is to be understood that one web page 1600 contains the information displayed in FIGS. 16A-16B, and a user may use a scroll bar to scroll to different portions of the web page 1600. The web page 1600 enables a user to: 1) select one or more music categories; 2) Name and Describe the station; and 3) indicate the user is Done or Add Specific Music. Initially, a user selects one or more music categories. In this example, Modern Rock 1602 has been selected. Next, the web page 1600 displays a scale 1604 that a user may use to indicate whether the selected category of music should be played less or more often. The web page 1600 also identifies examples of artists 1606 in the selected category. Then, a user may name the station 1610 (e.g., JMR) and describe the station 1612 (e.g., JUST MODERN ROCK). Next, the user may indicate they are done by selecting a Done control 1614 or add specific music to their station by selecting an Add Specific Music control 1616.

Figure 17:
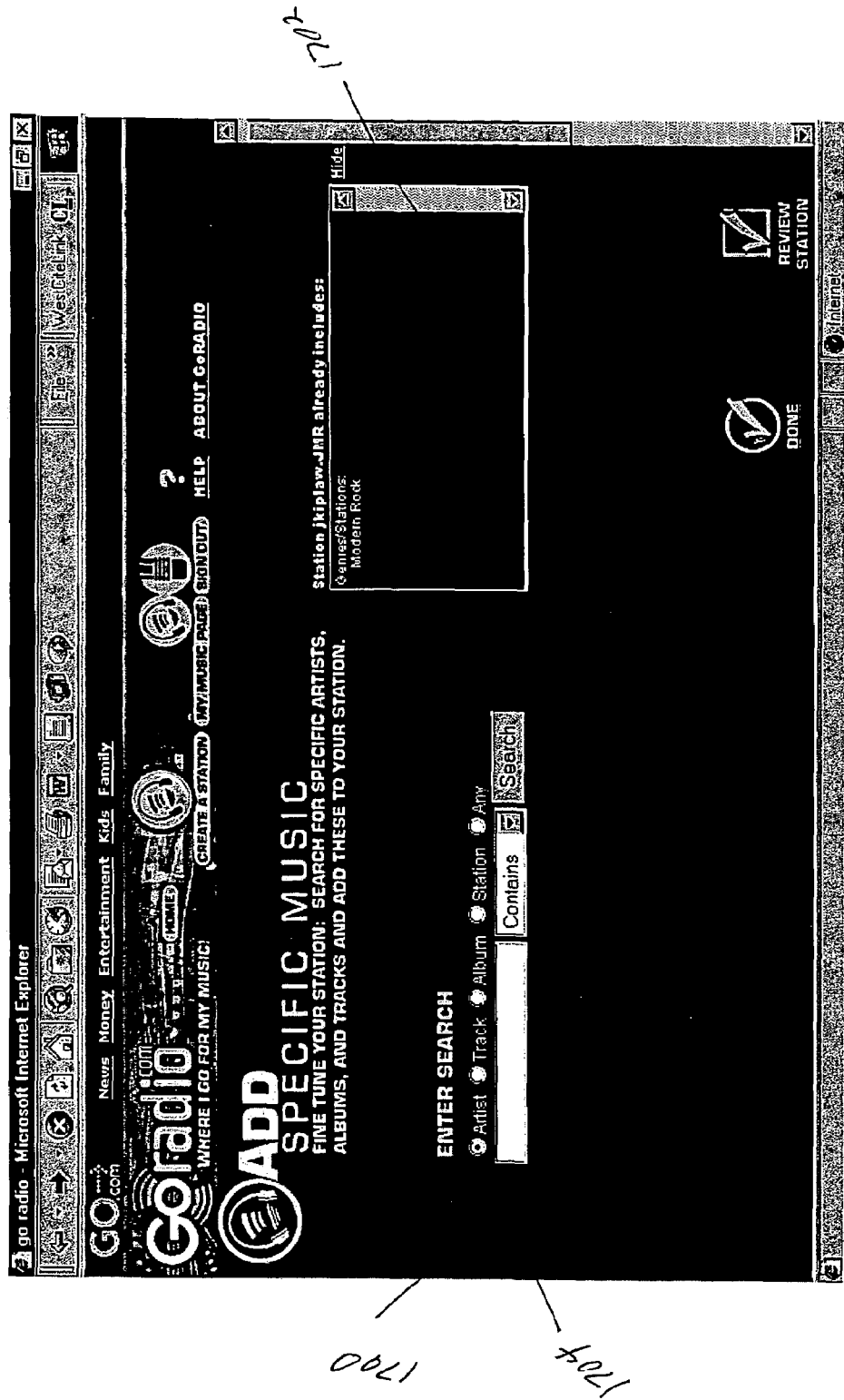
FIG. 17 illustrates a web page that is displayed to a user in response to selection of an Add Specific Music control.
Figure 18:
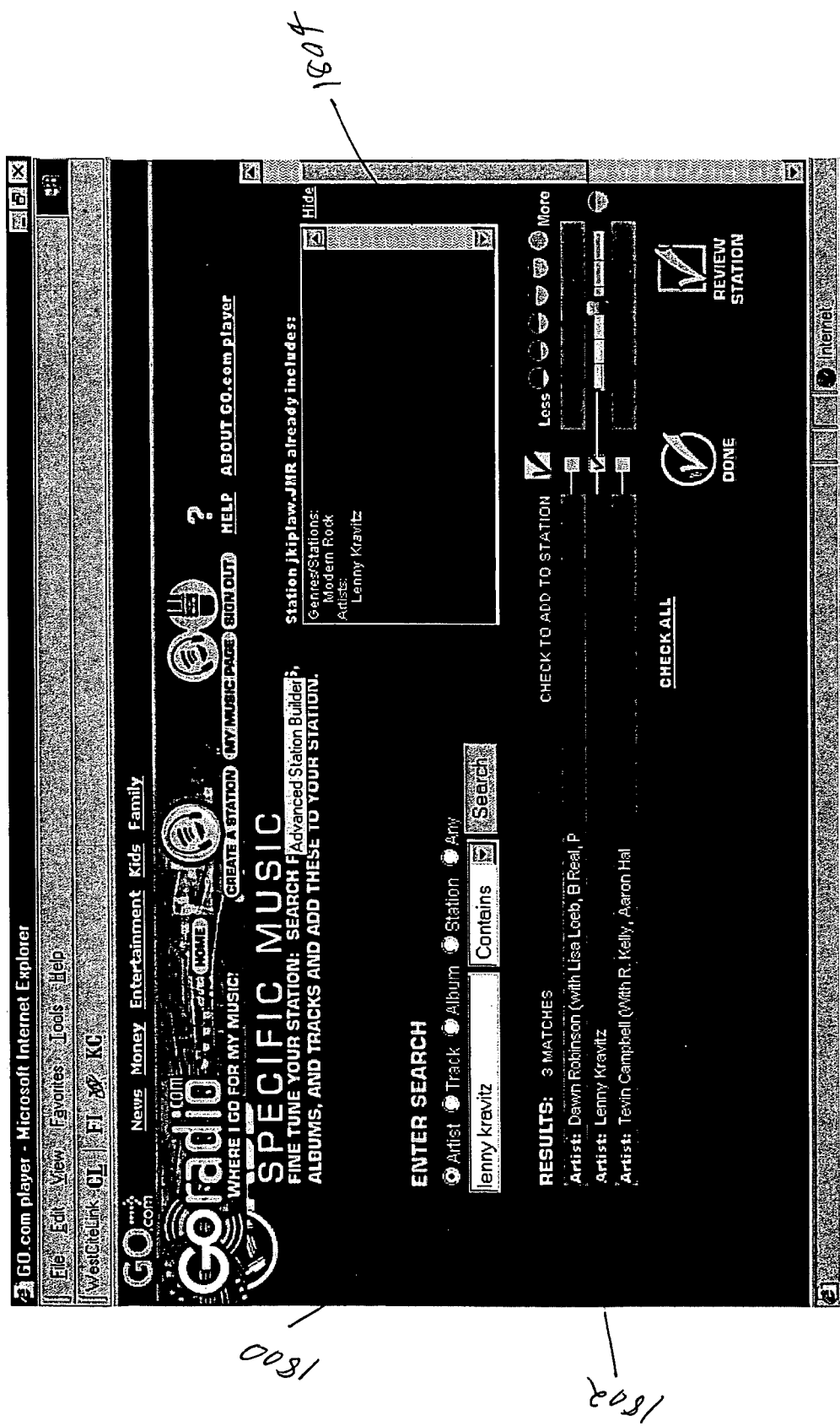
FIG. 18 illustrates a web page that is displayed to a user in response to a search for Artist Lenny Kravitz.

FIG. 17 illustrates a web page 1700 that is displayed to a user in response to selection of an Add Specific Music control. A text box 1702 lists music already selected for the station to which the user is adding specific music (e.g., Modern Rock). A user may use search controls to search for music by Artist, Track, Album, Station, or Any of these. In this example, a search was done for Artist Lenny Kravitz. FIG. 18 illustrates a web page 1800 that is displayed to a user in response to a search for Artist Lenny Kravitz. The web page lists possible matches for the requested search. A user may select one or more of the search results to be added to the station. In this example, the Artist Lenny Kravitz 1802 was added to the station, and the artist is listed in text box 1804.

Figure 19:
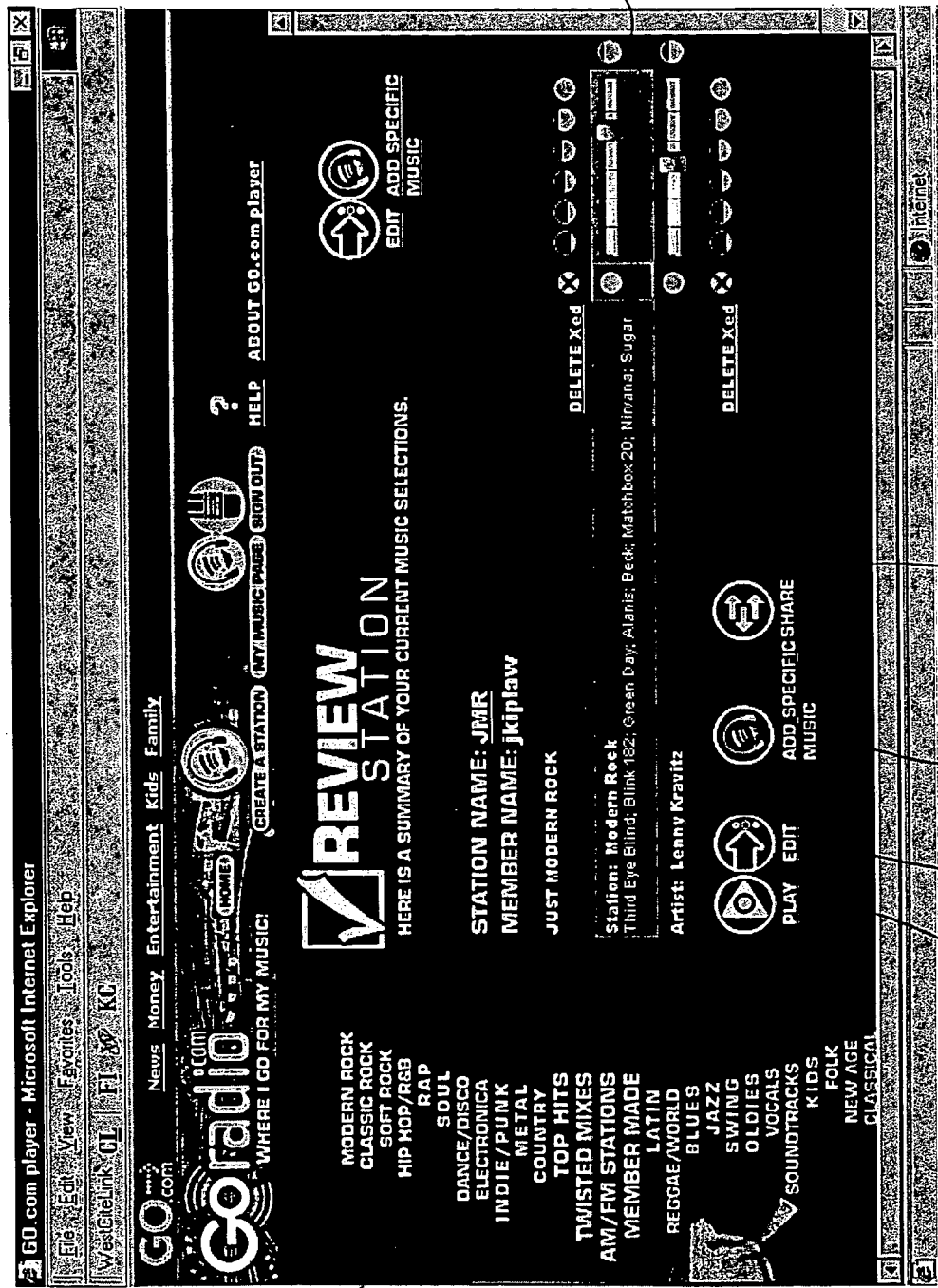
FIG. 19 illustrates a web page that is displayed to a user in response to indication that a user is done adding specific music to a user-created station.

FIG. 19 illustrates a web page 1900 that is displayed to a user in response to indication that a user is done adding specific music to a user-created station. The web page 1900 enables a user to play music with a Play control 1902, edit selections with an Edit control 1904, add other specific music with an Add Specific Music control 1906, or share music with a Share control 1908. A user may also adjust a frequency of music 1910 remove music from the station.

Figure 20:
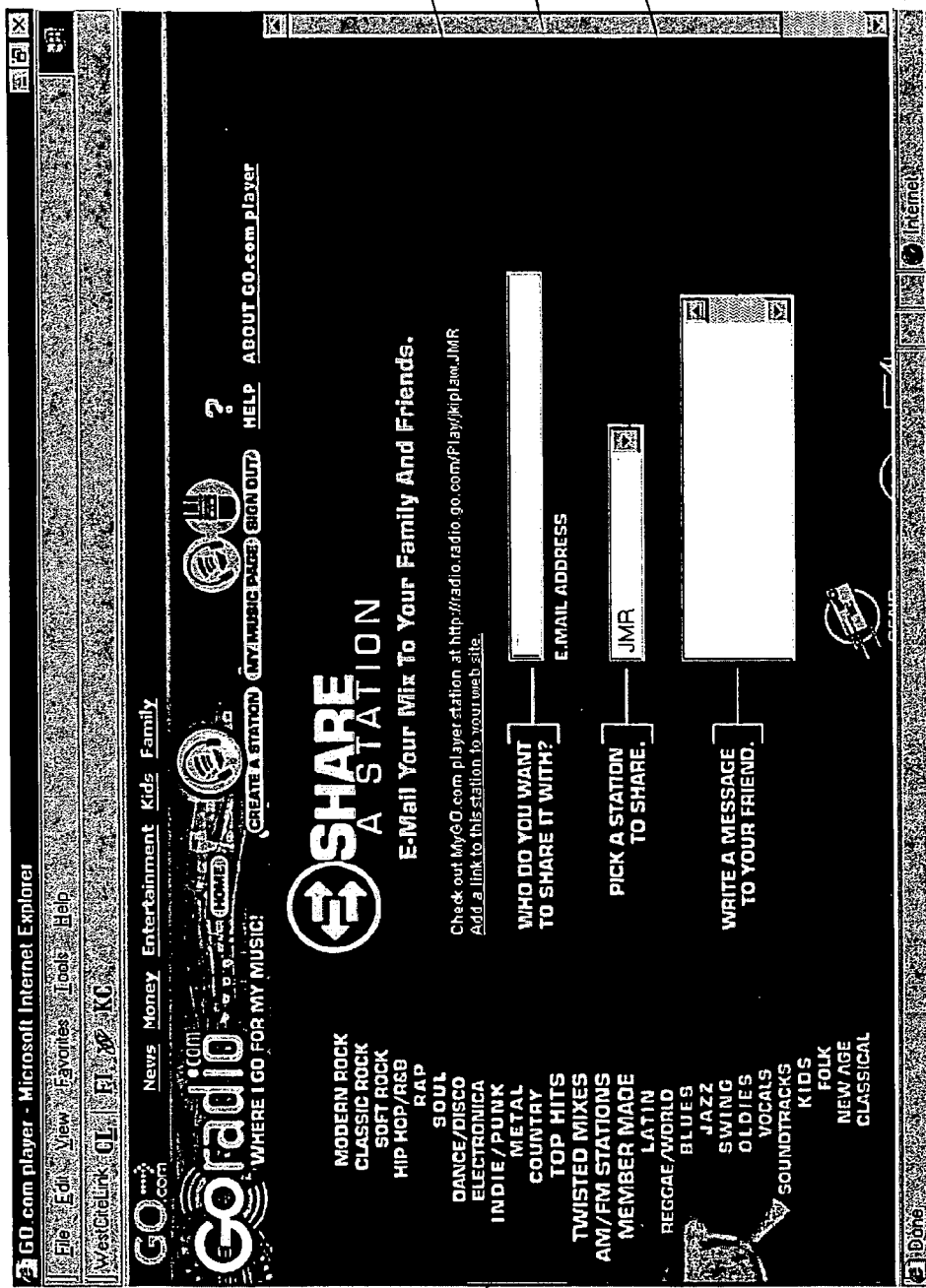
FIG. 20 illustrates a web page that is displayed to a user in response to selection of a Share control.

FIG. 20 illustrates a web page 2000 that is displayed to a user in response to selection of a Share control. The web page 2000 enables a user to share a user-created station with another user by entering that user's e-mail address 2002 and selecting a user-created station 2004. A user may also include a message to a friend in a message box 2006.

Figure 21A:
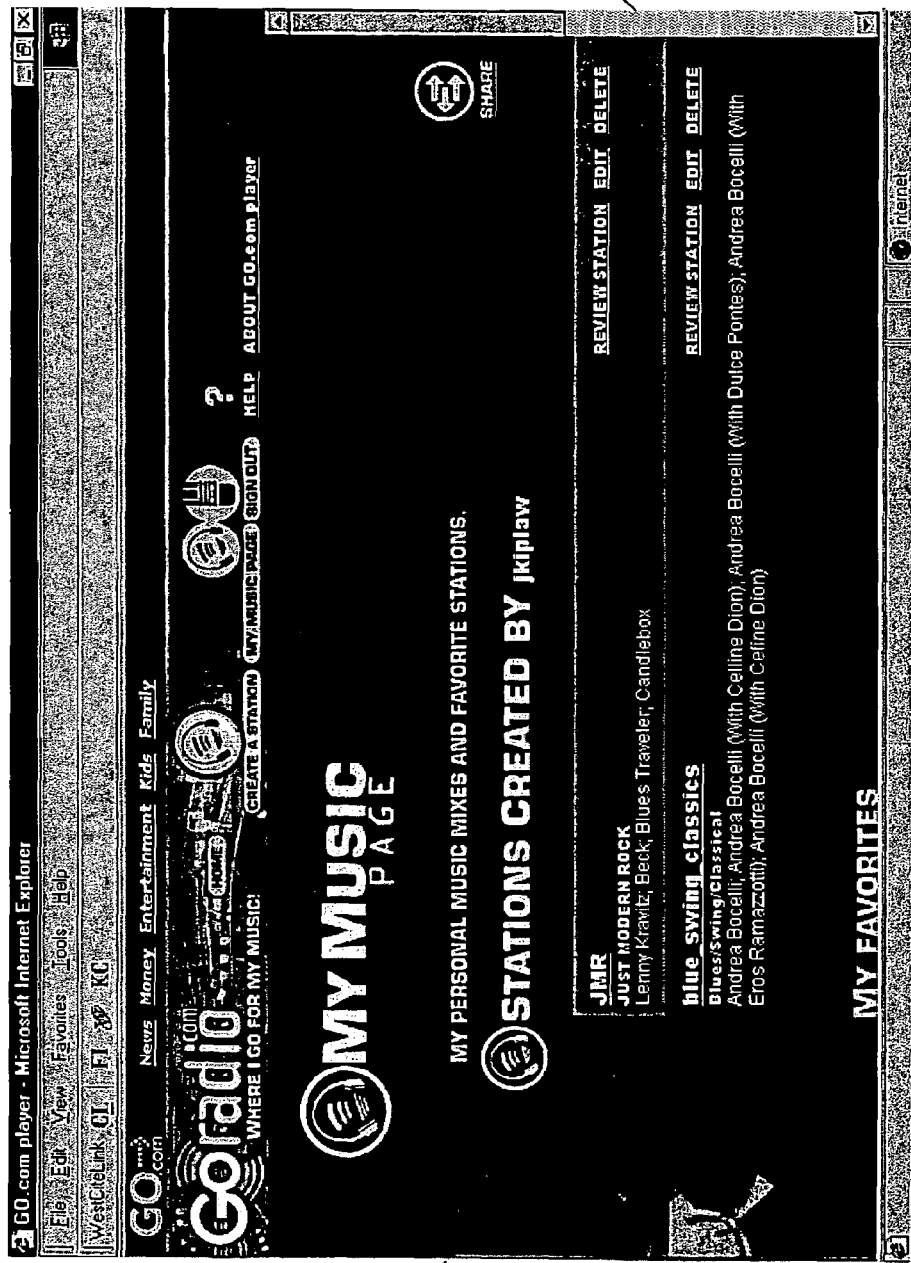
FIGS. 21A-21B illustrate a web page that is displayed to a user in response to selection of a My Music Page control.
Figure 21B:
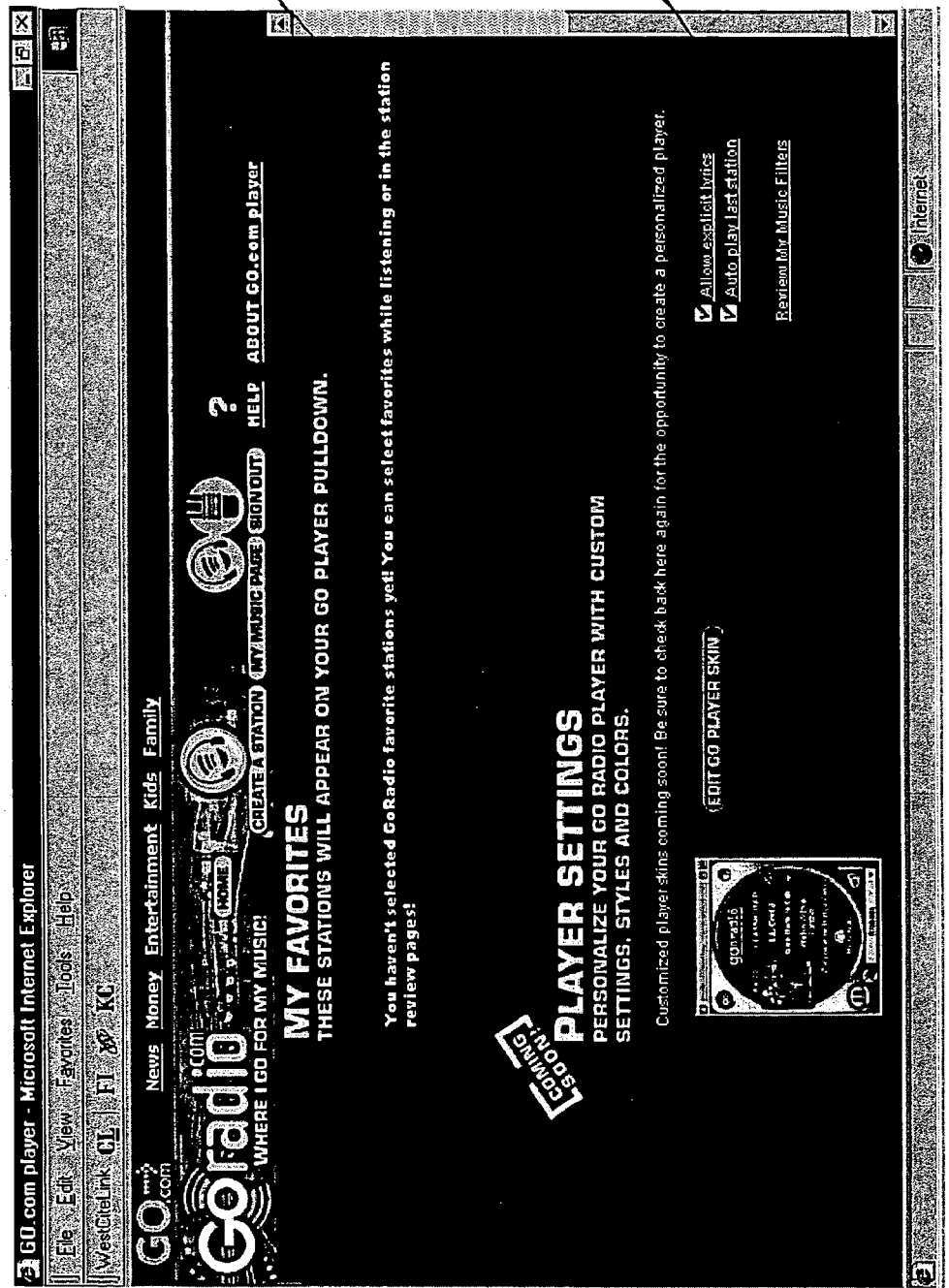

FIGS. 21A-21B illustrate a web page 2100 that is displayed to a user in response to selection of a My Music Page control. Although the web page is illustrated using two sheets of figures, it is to be understood that one web page 2100 contains the information displayed in FIGS. 21A-21B, and a user may use a scroll bar to scroll to different portions of the web page 2100. The web page 2100 lists user-created stations 2102. Additionally, the web page 2100 lists favorites 2104 that a user may select while listening to music or on review pages (e.g., web page 1900) and lists custom player settings 2106.

Playlist Creation

The playlist generator 220 creates a playlist based on various factors. The playlist generator 220 additionally inserts advertisements, promotions, and stingers into the playlist. In particular, each user has an associated user identifier. The user identifiers are combined with user profiling data (e.g., age range, gender, and interests obtained via the user interface illustrated on FIGS. 9A-9D and data on user's selection history, musical preferences, and station descriptions of selected stations) to determine appropriate audio or video data elements and to determine advertisements, promotions, and stingers that are to be inserted into the playlist. The advertisements, promotions, and stingers are inserted at a reasonable frequency. For example, an advertisement may be inserted after every four songs in the playlist, while a promotion may be inserted after every eight songs in the playlist. It is to be understood that these examples are for illustration only and are not intended to limit the invention. Any combination of data elements may be used for creating a playlist.

In one embodiment, a station (i.e., a grouping of data elements) consists of a list of weighted data elements (e.g., audio or video data elements), with each of the weighted data elements corresponding to an artist, a compact disc, a track, and/or other stations. Weighting determines the frequency with which each of the weighted data elements are played (e.g., a data element with a high weight is played more frequently than a data element with a low weight). An example of a station may be either the category "Twisted Mixes" or the subcategory "Top Hits".

In one embodiment, the weights of data elements alone are used to determine frequency of playing of a data element. However, in an alternative embodiment, user preferences may be used, either alone or in combination with the weights of data elements to determine frequency of playing of a data element. User preferences are captured in a "music filter". A user's "music filter" consists of weights of station data elements, such that they play more or less often. Though the user is given the option of "Never Playing" an artist, compact disc, or song, the playlist generator 220 may still play the proscribed content in order to comply with the current version of the Digital Millenium Copyright Act (DMCA). In one embodiment, all user-generated stations must contain at lease one "System Station". System Stations are pre-programmed to be compliant with the DMCA. It is to be understood that the DMCA may be modified at any time, and, thus, the System Station would be modified to remain in compliance.

The following is pseudocode for generating a playlist:

1. Identify all data elements that match the elements of a station.
  (Note that the station may be selected by a user or by the invention.)
2. Select a subset of the identified data elements (identified in step #1) for playing with a frequency based on:
  a. The weights found in the station.
  b. The user's "music filter" weights (for users which have them).
    (Note, the music filter weights may be optionally turned on or off.)
3. If a selected data element would cause greater than some specified number of data elements (e.g., three) to be associated with a sub-category (e.g., a sub-category may be an artist or compact disc), then drop that data element and continue processing at step #2.
4. Repeat steps 2 and 3 until a desired subset data elements have been selected (e.g., 80 data elements) or the playlist generator 220 has iterated sufficiently to know that it will not get more content that satisfies step #3 (e.g., after approximately 2000 tries).
5. If the subset has been collected, then continue processing at step #8, otherwise, continue processing at step #6.
6. If this is the second time to step #6, flag an error and exit.
7. Disable the user's "music filter" and return to step #2.
8. Order the selected data elements.
9. Insert advertising, promotions, stingers, and personality tracks.

Figure 22:
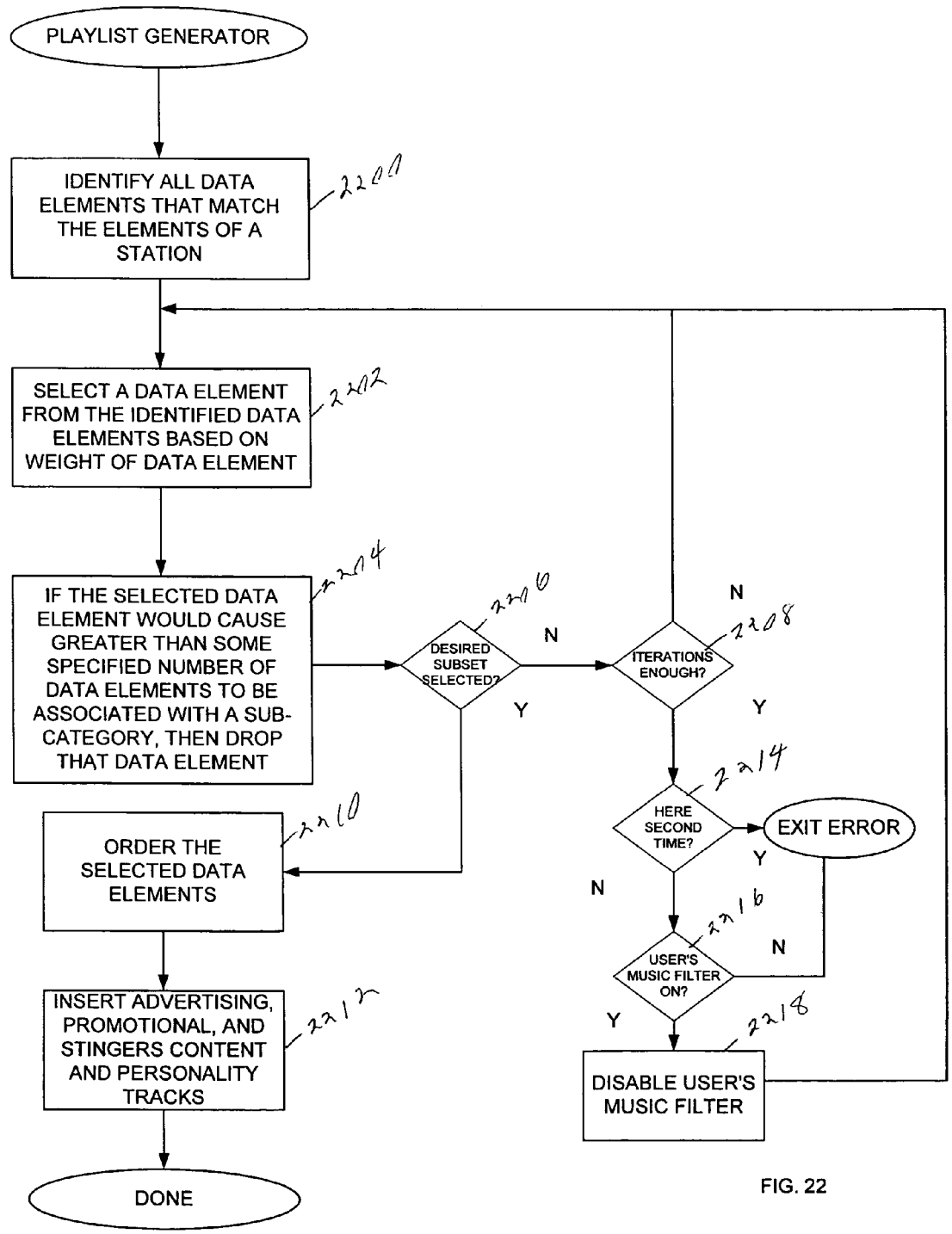
FIG. 22 illustrates a flow diagram of a process for generating a playlist in one embodiment of the invention.

FIG. 22 illustrates a flow diagram of a process for generating a playlist in one embodiment of the invention. Initially, in block 2200, the playlist generator 220 identifies all data elements that match the elements of a station. The station is one that has been selected, for example, by the user. Examples of stations include Twisted Mixes and Top Hits.

To create a playlist, the playlist generator 220 selects a subset of the identified data elements for playing. The subset may include all of the identified items or only a portion. In one embodiment, the subset is a system-defined limit of 80 data elements. However, one skilled in the art would recognize that 80 is used for illustration only and is not intended to limit the invention. The number of data elements selected may, in other embodiments, be defined by a user or may be a system-specified number different from 80.

To build the subset, in block 2202, the playlist generator 220 selects a data element from the identified data elements based on the weight of the data element. The selection of data elements is based on the weights found in the station and the user's "music filter" weights for users which have them (e.g., guests will not have music filter weights). The music filter weights may be optionally turned on or off by a user who has defined them.

In block 2204, if a selected data element would cause greater than a specified number of data elements to be associated with a sub-category (e.g., greater than three data elements to be played by an artist or from a single compact disc), then the playlist generator 220 drops the data element from the subset.

In block 2206, the playlist generator 220 determines whether the desired subset has been selected. If so, the playlist generator 220 continues to block 2210, otherwise, the playlist generator 220 continues to block 2208.

If the desired subset has not been selected in block 2206, processing continues with block 2208. In block 2208, the playlist generator 220 determines whether the number of iterations is enough. That is, the playlist generator 220 determines whether it has iterated sufficiently to know that it will not get more data elements without having an undesirable number of data elements associated with a particular sub-category. If so, the playlist generator 220 continues to block 2214, otherwise, the playlist generator 220 continues to block 2202.

In block 2214, playlist generator 220 determines whether it has come to this point a second time. If so, the playlist generator 220 exits with an error, otherwise, the playlist generator 220 continues to block 2216.

In block 2216, the playlist generator 220 determines whether the user's music filter is on. If so, the playlist generator 220 continues to block 2218 to disable the user's music filter and continue at block 2202. Otherwise, the playlist generator 220 exits with an error.

In block 2210, the playlist generator 220 orders the selected data elements in the subset. For example, the playlist generator 220 may "shuffle" the data elements into a "random" order or the playlist generator 220 may order the data elements to avoid data elements from one or related subcategories from being played close together. In block 2212, the playlist generator 220 inserts advertising, promotions, stingers, and personality tracks into the list of data elements.

CONCLUSION

This concludes the description of the preferred embodiment of the invention. The following describes some alternative embodiments for accomplishing the present invention. For example, any type of computer, such as a mainframe, minicomputer, or personal computer, or computer configuration, such as a timesharing mainframe, local area network, or standalone personal computer, could be used with the present invention.

The foregoing description of the preferred embodiment of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

What is claimed is:

1. A method of providing data that is available on one or more data stores to a client device comprising the steps of:
providing a user interface associated with the client device to enable the user to specify user desired data;
fetching the specified user desired data that is available on one or more of the data stores via a plugin module by first determining whether the specified user desired data is located on a ram or disk cache located on the client device and if the specified user desired data is not located on a ram or disk cache located on the client device then second determining if the specified user desired data is located on a reverse proxy caching connection and if the specified user desired data is not located on a reverse proxy caching connection then third determining if the specified user desired data is located on a web server or other remote network;
aggregating the fetched user desired data into a media stream, and
providing the media stream to the client device.

2. The method of claim 1, wherein the user desired data comprises a list of data elements.

3. The method of claim 2, wherein individual data elements contained in the list of data elements are located at diverse locations on one or more of the data stores.

4. The method of claim 2, wherein the step of aggregating the fetched user desired data into a media stream further comprises:
concatenating the list of data elements to create the media stream.

5. The method of claim 1, wherein the user interface provides categories of data.

6. The method of claim 5, wherein the categories of data include music categories.

7. The method of claim 5, wherein the categories of data include news categories.

8. The method of claim 1, wherein the desired data comprises one or more music files that are played with a media player.

9. The method of claim 8, further comprising providing a music controller.

10. The method of claim 8, wherein the user interface enables a user to create music filters.

11. The method of claim 10, wherein one of the music filters comprises data on how frequently a music file is to be played.

12. The method of claim 10, wherein the user interface enables a user to create a custom station.

13. The method of claim 12, wherein the user interface enables a user to share the custom station with another user.

14. An apparatus for providing data available on one or more data stores to a client device, comprising:
the client device being capable of accessing the one or more data stores;
a user interface associated with the client device to enable a user to specify user desired data; and
a plugin module associated with the client device operable to fetch the specified user desired data that is available on one or more or the data stores, aggregate the fetched user desired data into a media stream, and provide the media stream to the client device;
wherein the plugin module fetches the specified user desired data by first determining whether the specified user desired data is located on a ram or disk cache located on the client device and if the specified user desired data is not located on a ram or disk cache located on the client device then second determining if the specified user desired data is located on a reverse proxy caching connection and if the specified user desired data is not located on a reverse proxy caching connection then third determining if the specified user desired data is located on a web server or other remote network.

15. The apparatus of claim 14, wherein the user desired data comprises a list of data elements.

16. The apparatus of claim 15, wherein individual data elements contained in the list of data elements are located at diverse locations on one or more of the data stores.

17. The apparatus of claim 15, wherein the list of data elements is concatenated to create the media stream.

18. The apparatus of claim 14, wherein the user desired data comprises one or more music files that are played with a media player.

19. The apparatus of claim 18, further comprising providing a music controller.

20. The apparatus of claim 18, wherein the user interface enables a user to create music filters.

21. The apparatus of claim 20, wherein a music filter comprises data on how frequently a music file is to be played.

22. The apparatus of claim 18, wherein the user interface enables a user to create a custom station.

23. The apparatus of claim 22, wherein the user interface enables a user to share the custom station with another user.

24. An article of manufacture comprising computer program media readable by a computer and having stored thereon one or more instructions executable by the computer to perform method steps for providing data from multiple data stores to a client device wherein the client device has an associated plugin program, the method comprising:
providing a user interface to enable the user to specify desired data via the plugin;
fetching the specified desired data by first determining whether the specified user desired data is located on a ram or disk cache located on the client device and if the specified user desired data is not located on a ram or disk cache located on the client device then second determining if the specified user desired data is located on a reverse proxy caching connection and if the specified user desired data is not located on a reverse proxy caching connection then third determining if the specified user desired data is located on a web server or other remote network; and aggregating the fetched data into a media stream; and providing the media stream to the client device.

25. The article of manufacture of claim 24, wherein the user interface provides categories of data.

26. The article of manufacture of claim 25, wherein the categories of data include music categories.

27. The article of manufacture of claim 25, wherein the categories of data include news categories.

28. The article of manufacture of claim 24, wherein the desired data comprises one or more music files that are played with a media player.

29. The article of manufacture of claim 28, further comprising providing a music controller.

30. The article of manufacture of claim 28, wherein the user interface enables a user to create music filters.

31. The article of manufacture of claim 30, wherein a music filter comprises data on how frequently a music file is to be played.

32. The article of manufacture of claim 28, wherein the user interface enables a user to create a custom station.

33. The article of manufacture of claim 32, wherein the user interface enables a user to share the custom station with another user.

34. A method of providing data that is available on one or more data stores to a client device comprising:

specifying user desired data;

fetching the specified user desired data in a non-concatenated form by first determining whether the specified user desired data is located on a ram or disk cache located on the client device and if the specified user desired data is not located on a ram or disk cache located on the client device then second determining if the specified user desired data is located on a reverse proxy caching connection and if the specified user desired data is not located on a reverse proxy caching connection then third determining if the specified user desired data is located on a web server or other remote network;

concatenating the fetched user desired data, and providing the concatenated user desired data to the client device.

35. An apparatus for providing data to a user of a client computer, comprising:

a client computer capable of accessing multiple data stores; and one or more computer programs adapted to be executed by the client computer for providing a user interface to enable the user to identify desired data from one or more of the data stores, retrieve the desired data in a non-concatenated form by first determining whether the desired data is located on a ram or disk cache located on the client device and if the desired data is not located on a ram or disk cache located on the client device then second determining if the desired data is located on a reverse proxy caching connection and if the desired data is not located on a reverse proxy caching connection then third determining if the desired data is located on a web server or other remote network, concatenate the desired data on the client computer, and provide the desired concatenated data to the user.

* * * * *